US012787916B2

(12) United States Patent
Wang et al.

(10) Patent No.: US 12,787,916 B2
(45) Date of Patent: Nov. 10, 2026

(54) RIDING MOWING DEVICE

(71) Applicant: Nanjing Chervon Industry Co., Ltd., Nanjing (CN)

(72) Inventors: Zhen Wang, Nanjing (CN); Cheng Dai, Nanjing (CN); Toshinari Yamaoka, Nanjing (CN); Shuai Geng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 424 days.

(21) Appl. No.: 18/511,291

(22) Filed: Nov. 16, 2023

(65) Prior Publication Data

US 2024/0081178 A1 Mar. 14, 2024

Related U.S. Application Data

(63) Continuation of application No. PCT/CN2022/137609, filed on Dec. 8, 2022.

(30) Foreign Application Priority Data

Dec. 15, 2021 (CN) ......................... 202111531846.4

(51) Int. Cl.

*A01D 34/66* (2006.01)
*A01D 34/68* (2006.01)

(Continued)

(52) U.S. Cl.

CPC ............. *A01D 34/66* (2013.01); *A01D 34/74* (2013.01); *A01D 34/78* (2013.01); *A01D 34/824* (2013.01); *A01D 67/04* (2013.01)

(58) Field of Classification Search

CPC ........ A01D 34/66; A01D 34/74; A01D 34/78; A01D 34/824; A01D 34/82; A01D 67/04;

(Continued)

(56) References Cited

U.S. PATENT DOCUMENTS 5,232,005 A * 8/1993 Mitchell ................ A01D 34/81 224/571
7,066,294 B2 * 6/2006 Ishii ..................... B62D 11/183 180/305

(Continued)

FOREIGN PATENT DOCUMENTS

CA 3087293 A1 10/2023
CN 2337751 Y 9/1999

(Continued)

OTHER PUBLICATIONS

International Search Report and Written Opinion issued on PCT application No. PCT/CN2022/137609, dated Mar. 2, 2023, 13 pages.

(Continued)

*Primary Examiner* — Robert E Pezzuto
(74) *Attorney, Agent, or Firm* — Greenberg Traurig, LLP

(57) ABSTRACT

A riding mowing device includes a frame; a cutting assembly; a traveling assembly configured to drive the riding mowing device to travel and including a first traveling assembly located on the front part of the riding mowing device and a second traveling assembly located on the rear part of the riding mowing device, where the first traveling assembly and the second traveling assembly are separately mounted on the frame; and a power supply assembly configured to supply power to at least the cutting assembly and the traveling assembly and mounted to the frame. The riding mowing device further includes one of a steering wheel assembly and an operating lever assembly, and one of the steering wheel assembly and the operating lever assembly is selectively mounted on the frame.

18 Claims, 15 Drawing Sheets

(51) Int. Cl.

| | |
|---|---|
| ***A01D 34/74*** | (2006.01) |
| ***A01D 34/78*** | (2006.01) |
| ***A01D 34/82*** | (2006.01) |
| ***A01D 67/04*** | (2006.01) |

(58) Field of Classification Search
CPC . B62D 3/02; B62D 3/12; B62D 6/001; B62D 11/003; B62D 11/24; B62D 11/04; B62D 11/02; B62D 11/18; B62D 11/183
See application file for complete search history.

(56) References Cited

U.S. PATENT DOCUMENTS

| | | | | |
|---|---|---|---|---|
| 2002/0059788 | A1 * | 5/2002 | Velke | A01D 34/64 56/14.7 |
| 2007/0130902 | A1 | 6/2007 | Murawski | |
| 2009/0272088 | A1 * | 11/2009 | Losey | A01D 34/001 56/14.7 |
| 2014/0059990 | A1 * | 3/2014 | Fujiwara | F02D 41/2422 56/10.8 |
| 2019/0071112 | A1 * | 3/2019 | Toddenroth | B62D 1/046 |
| 2020/0269917 | A1 * | 8/2020 | Welz | A01D 34/824 |
| 2020/0315095 | A1 * | 10/2020 | Liu | A01D 69/02 |
| 2021/0329836 | A1 | 10/2021 | Wang | |
| 2022/0287238 | A1 * | 9/2022 | Mika | A01D 43/077 |

FOREIGN PATENT DOCUMENTS

| | | | |
|---|---|---|---|
| CN | 101213900 | B | 4/2011 |
| CN | 103895545 | A | 7/2014 |
| CN | 209710730 | U | 12/2019 |
| CN | 111756280 | A | 10/2020 |
| CN | 212034865 | U | 12/2020 |
| CN | 113115625 | A | 7/2021 |
| CN | 214430195 | U | 10/2021 |
| CN | 113573573 | B | 6/2023 |
| JP | 3153905 | U | 4/2001 |
| JP | 2005125967 | A | 5/2005 |
| JP | 4685564 | B2 | 5/2011 |
| JP | 2017175984 | A | 10/2017 |

OTHER PUBLICATIONS

ISA/CN, International Search Report issued on PCT application No. PCT/CN2022/137609, dated Mar. 2, 2023, 5 pages.

ISA/CN, Translation of International Search Report issued on PCT application No. PCT/CN2022/137609, dated Mar. 2, 2023, 3 pages.

ISA/CN, Written Opinion issued on PCT application No. PCT/CN2022/137609, dated Mar. 2, 2023, 3 pages.

ISA/CN, Translation of Written Opinion issued on PCT application No. PCT/CN2022/137609, dated Mar. 2, 2023, 3 pages.

* cited by examiner

RIDING MOWING DEVICE

RELATED APPLICATION INFORMATION

This application is a continuation of International Application Number PCT/CN2022/137609, filed on Dec. 8, 2022, through which this application also claims the benefit under 35 U.S.C. § 119(a) of Chinese Patent Application No. 202111531846.4, filed on Dec. 15, 2021, which applications are incorporated herein by reference in their entireties.

TECHNICAL FIELD

The present application relates to garden tools, for example, a riding mowing device.

BACKGROUND

As a garden tool, a mower is widely used in the field of trimming lawns and vegetation. A riding mower is more labor-saving and more efficient in mowing than a push mower. In the steering control of the riding mower, to satisfy the mowing requirements, the riding mower needs to be capable of turning at flexible angles. However, the steering operation of a traditional riding mower results in more mowing effort and time of novices. A traditional zero-turn riding mower is generally controlled by operating levers. Since a user needs to adjust the directions of the operating levers on two sides of the seat, the riding mower using the operating levers is not conducive to the operation of the novices. It is easier for a novice user to use a riding mower with a steering wheel since the operation of the steering wheel is similar to driving. Moreover, just like in a car, the steering wheel is only used for controlling the traveling direction, and a separate accelerator pedal is used for controlling the traveling speed, making the operation simple. However, for users who are familiar with the operating levers, since the free control of both the traveling direction and the traveling speed is integrated into the operating levers, the operating levers are loved by some users.

SUMMARY

A riding mowing device includes a frame; a cutting assembly including a cutting deck and a mowing element, where the mowing element is at least partially accommodated in the cutting deck, and the cutting assembly is mounted to the frame; a traveling assembly configured to drive the riding mowing device to travel and including a first traveling assembly located on the front part of the riding mowing device and a second traveling assembly located on the rear part of the riding mowing device, where the first traveling assembly and the second traveling assembly are separately mounted on the frame; and a power supply assembly configured to supply power to at least the cutting assembly and the traveling assembly and mounted to the frame. The riding mowing device further includes one of a steering wheel assembly and an operating lever assembly, and one of the steering wheel assembly and the operating lever assembly is selectively mounted on the frame.

A riding mowing device includes a seat configured for a user to sit on and including a seat cushion and a backrest; a cutting assembly including a cutting deck and a mowing element, where the mowing element is at least partially accommodated in the cutting deck; a traveling assembly configured to drive the riding mowing device to travel and including a first traveling assembly located on the front part of the riding mowing device and a second traveling assembly located on the rear part of the riding mowing device; a power supply assembly configured to supply power to at least the cutting assembly and the traveling assembly; and a display interface configured to display the state information of at least one of the cutting assembly, the traveling assembly, and the power supply assembly and including a display screen. The riding mowing device further includes one of a steering wheel assembly and an operating lever assembly, and one of the steering wheel assembly and the operating lever assembly is selectively mounted on the riding mowing device; when the steering wheel assembly is mounted on the riding mowing device, the steering wheel assembly includes a steering wheel and a support rod, and the display interface is disposed in the middle of the steering wheel; and when the operating lever assembly is mounted on the riding mowing device, the operating lever assembly includes a left operating lever and a right operating lever, the left operating lever and the right operating lever are mounted on the left side and the right side of the seat, respectively, and the display interface is disposed on at least one of the left side and the right side of the seat.

DETAILED DESCRIPTION

Figure 1:
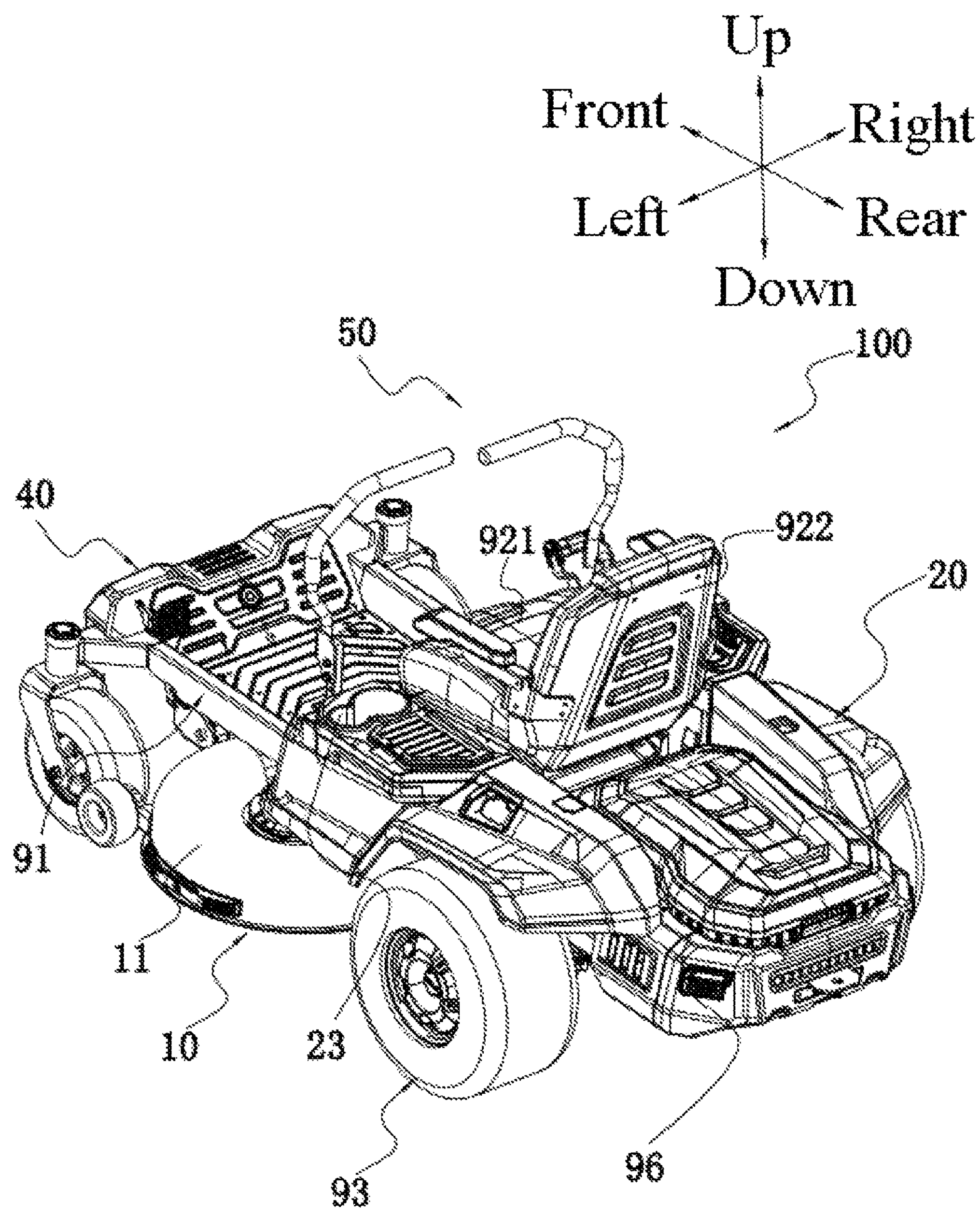
FIG. 1 is a perspective view of a riding mower in a first assembly manner according to an example of the present application.

As shown in FIG. 1, a riding mowing device in the present disclosure is a riding mower 100. A user may sit on the riding mower 100 to control the riding mower 100 to trim lawns and other vegetation.

In this specification, directions such as the front, rear, left, right, up, and down are described as directions shown in FIG. 1. For example, when the user sits on the riding mower 100 on the ground, it is defined that a direction which the user faces is the front, a direction which the user faces away from is the rear, a direction on the left-hand side of the user is the left, a direction on the right-hand side of the user is the right, a direction facing the ground is the down, and a direction facing away from the ground is the up.

Figure 2:
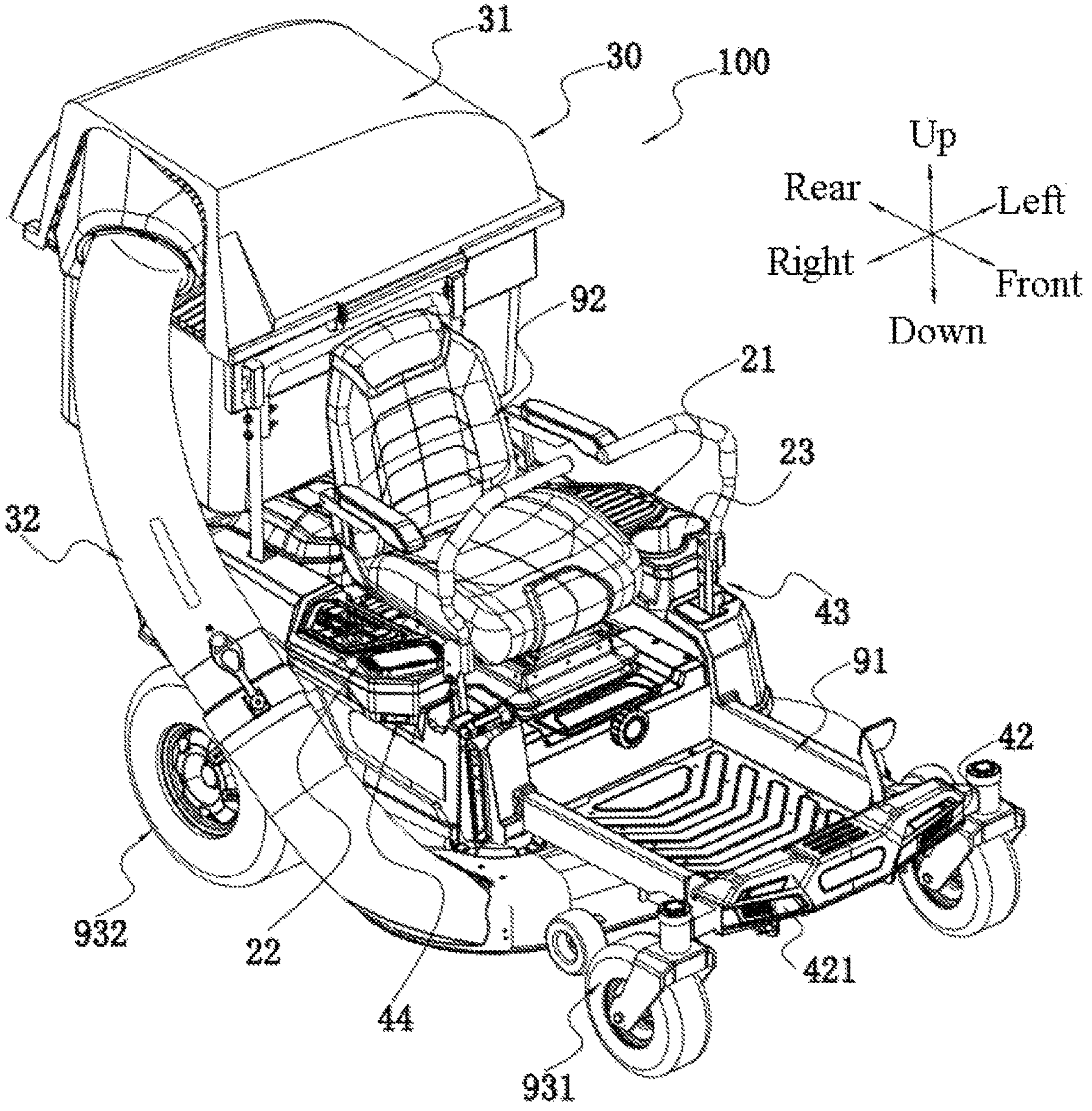
FIG. 2 is a perspective view of the riding mower in FIG. 1 to which a grass collecting system is mounted.
Figure 3:
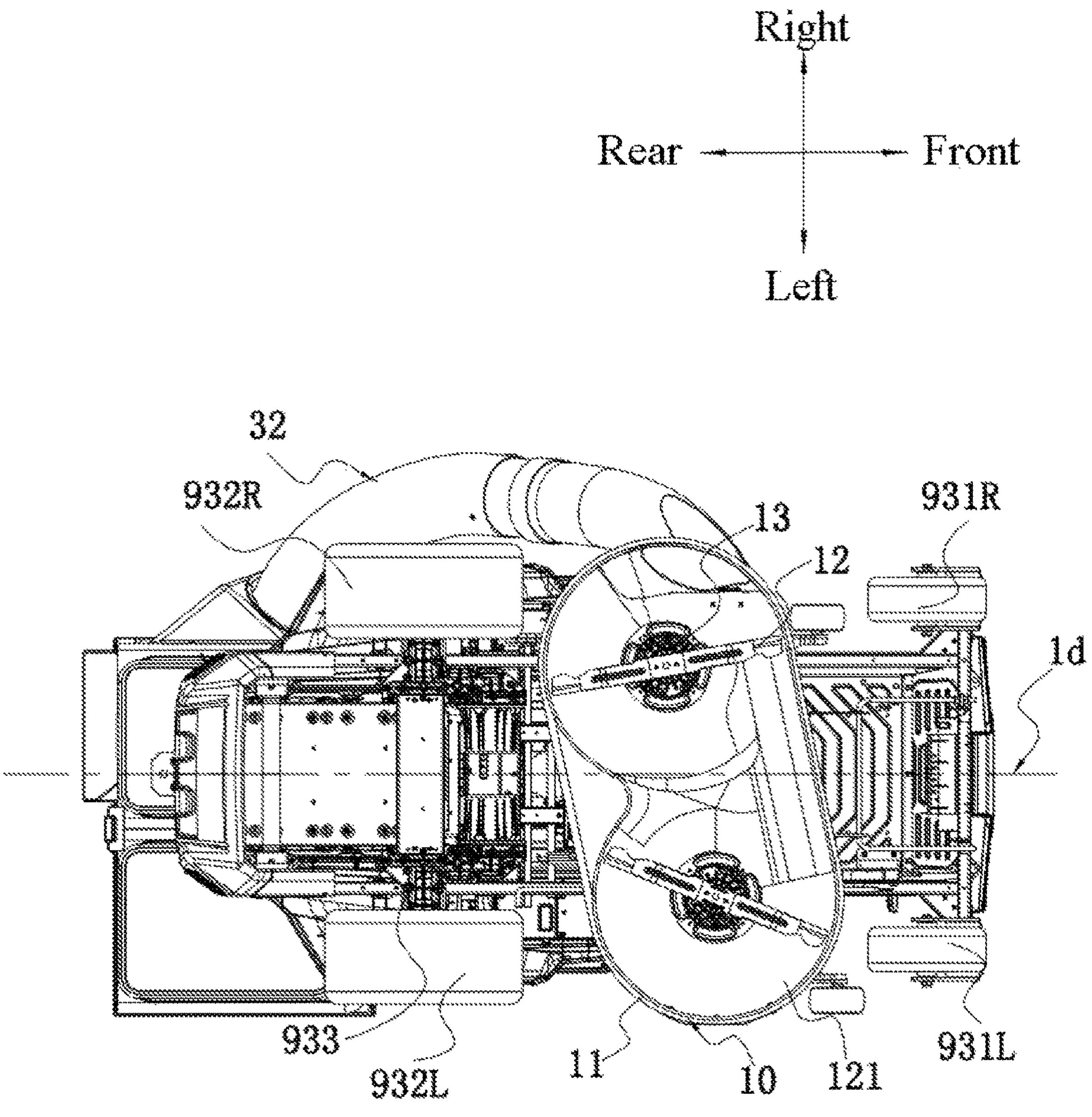
FIG. 3 is a bottom view of the riding mower in FIG. 2.

In this example, the riding mower 100 has at least a first assembly manner and a second assembly manner. Depending on different components assembled in the two assembly manners, the riding mower 100 has two operating modes, which are operating with operating levers and operating with a steering wheel. As shown in FIGS. 1 to 3, the riding mower 100 includes a cutting assembly 10, a frame 91, a seat 92, a housing system 20, a traveling assembly 93, a power supply assembly 96, an illumination system 40, and an operating assembly 50. The frame 91 and the housing system 20 form a body 100*a* of the riding mower 100, the body 100*a* is used for mounting the cutting assembly 10, the seat 92, the power supply assembly 96, and the illumination system 40, and the traveling assembly 93 is configured to support the body 100*a*. The seat 92 includes a seat cushion 921 and a backrest 922. The seat cushion 921 is configured for the user to sit on, and the backrest 922 is configured to support the back of the user. The riding mower 100 supplies energy to the cutting assembly 10, the traveling assembly 93, the illumination system 40, and the like through a power assembly. In this example, the power assembly of the riding mower 100 is the power supply assembly 96, and the power supply assembly 96 supplies electrical energy to each assembly of the riding mower 100 so that the riding mower 100 can be used as a power tool. The electric riding mower 100 is more environmentally friendly and more energy-efficient than a fuel-based riding mower 100.

The cutting assembly 10 is configured to output power to implement the function of the riding mower 100. The cutting assembly 10 serves as a power output member, and the body 100*a* supports the power output member. Referring to FIG. 3, the cutting assembly 10 includes a cutting deck 11, mowing elements 12, and first motors 13. The mowing elements 12 are configured to cut the vegetation when the mowing elements 12 rotate at a high speed. For example, the mowing elements 12 are blades for cutting grass on a lawn. The cutting deck 11 surrounds a mowing space 121 for accommodating at least part of the mowing elements 12, that is to say, the mowing elements 12 are at least partially accommodated in the cutting deck 11. The first motors 13 are configured to drive the mowing elements 12 to rotate. The cutting assembly 10 is disposed below the frame 91. In an example, two mowing elements 12 may be provided, two first motors 13 may be provided, and correspondingly, the two first motors 13 separately drive the two mowing elements 12. In an example, three mowing elements 12 may be provided, three first motors 13 may be provided, and correspondingly, the three first motors 13 separately drive the three mowing elements 12. The mowing elements 12 are located in the mowing space 121 surrounded by the cutting deck 11. The mowing space 121 is open downward so that the mowing elements 12 can perform the cutting operation on the vegetation below the mowing space 121. As shown in FIG. 2, the riding mower 100 may further include a grass collecting system 30 configured to collect grass clippings cut by the cutting assembly 10. The grass collecting system 30 includes a grass collecting basket assembly 31 detachably mounted behind the seat 92. In other words, the grass collecting basket assembly 31 is mounted behind the backrest 922. When the riding mower 100 is in a grass discharge mode, the grass collecting basket assembly 31 does not need to be mounted. When the riding mower 100 is in a grass collecting mode, the grass collecting basket assembly 31 is mounted so that the cut grass clippings can be collected into the grass collecting basket assembly 31 through a grass collecting tube.

The frame 91 extends basically along the front and rear direction of the riding mower 100. The cutting assembly 10, the housing system 20, the traveling assembly 93, the power supply assembly 96, the grass collecting system 30, and the illumination system 40 are all mounted to the frame 91. The frame 91 is configured to support the body 100*a* of the entire riding mower 100. The traveling assembly 93 is configured to support the frame 91 so that the riding mower 100 can travel on the ground. The traveling assembly 93 includes a first traveling assembly 931 and a second traveling assembly 932. In this example, the first traveling assembly 931 is a front traveling assembly and includes two first traveling wheels which are a left first traveling wheel 931L and a right first traveling wheel 931R; and the second traveling assembly 932 is a rear traveling assembly and includes two second traveling wheels which are a left second traveling wheel 932L and a right second traveling wheel 932R. The radius of the second traveling wheels is greater than the radius of the first traveling wheels. The left first traveling wheel 931L and the right first traveling wheel 931R are connected through a front axle 934, and the left second traveling wheel 932L and the right second traveling wheel 932R are connected through a rear axle. The traveling assembly 93 further includes a second motor 933 for driving the second traveling assembly 932.

Figure 4:
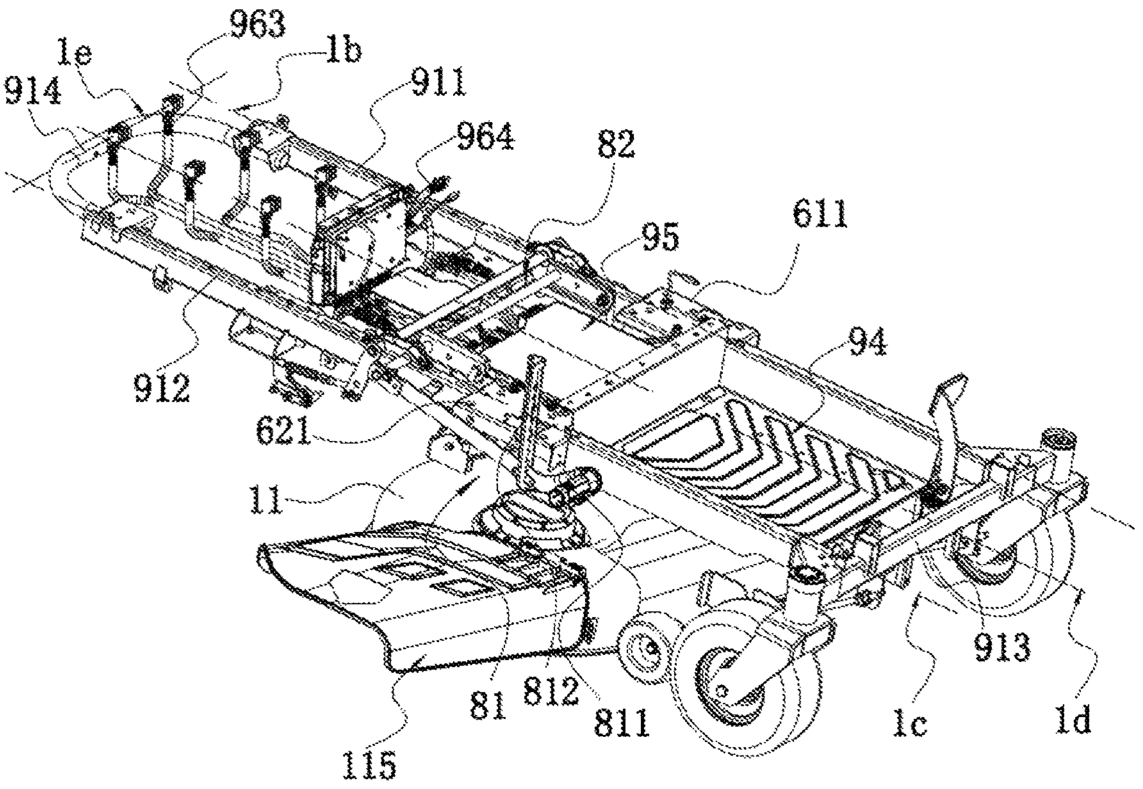
FIG. 4 is a perspective view of part of the assemblies of the riding mower in FIG. 1.

Referring to FIG. 4, the frame 91 includes longitudinal beams and cross beams. In some examples, the frame 91 includes two longitudinal beams which are separately a first longitudinal beam 911 and a second longitudinal beam 912. The frame 91 further includes two cross beams which are separately a first cross beam 913 and a second cross beam 914. The first longitudinal beam 911 is disposed on the left side of the seat 92, and the second longitudinal beam 912 is disposed on the right side of the seat 92. The first longitudinal beam 911 extends along a first straight line 1*b*, and the second longitudinal beam 912 extends along a second straight line 1*c*, where the first straight line 1*b* and the second straight line 1*c* are both parallel to a middle plane 1*d* of the riding mower 100. In this example, the extension direction of the first longitudinal beam 911 is parallel to the extension direction of the second longitudinal beam 912. The first cross beam 913 is disposed basically at the front end of the riding mower 100. In this manner, the first cross beam 913 serves as a front bumper for protecting the front end of the riding mower 100 from being damaged. The second cross beam 914 is disposed basically at the rear end of the riding mower 100. In this manner, the second cross beam 914 serves as a rear bumper for protecting the rear end of the riding mower 100 from being damaged. The first cross beam 913 and the second cross beam 914 at least partially extend along a transverse straight line 1*e*, where the transverse straight line 1*e* extends along the left and right direction. In this example, the extension direction of the first cross beam 913 is parallel to the extension direction of the second cross beam 914, while the transverse straight line 1*e* is perpendicular to the first straight line 1*b* and the second straight line 1*c*.

The housing system 20 includes a left cover 21 and a right cover 22. The left cover 21 is disposed on the left side of the seat 92, and the right cover 22 is disposed on the right side of the seat 92. The left cover 21 at least partially covers the left second traveling wheel 932L, and the right cover 22 at least partially covers the right second traveling wheel 932R. The structures and materials of the left cover 21 and the right cover 22 are not limited in the present application. A first storage bin 23 for storing an object is disposed on the left cover 21 or the right cover 22. For example, the first storage bin 23 may be configured in a shape for placing water cups, which is convenient for the user to place the water cups. The first storage bin 23 may also be configured in a rectangular shape, which is convenient for the user to place a mobile phone and other sundries. The first storage bin 23 may be provided with a cover to prevent dust, grass clippings, and the like from entering the first storage bin 23. In this example, the housing system 20 further includes a base plate 94 sandwiched between the first longitudinal beam 911 and the second longitudinal beam 912 so that when sitting on the riding mower 100, the user may step on the base plate 94.

The illumination system 40 includes a front illumination assembly 42, a left illumination assembly 43, and a right illumination assembly 44. In an example, the illumination system 40 further includes a rear illumination assembly. The front illumination assembly 42 is disposed at the frontmost end of the base plate 94, the left illumination assembly 43 is disposed on the left side of the seat 92, the right illumination assembly 44 is disposed on the right side of the seat 92, and the rear illumination assembly is disposed on the rear side of the seat 92. In an example, the front illumination assembly 42 includes two front lights 421, and the two front lights 421 are symmetrical about a centerline 1*d* of the riding mower 100. The left illumination assembly 43 is mounted on the left cover 21 and includes a left light, and the right illumination assembly 44 is mounted on the right cover 22 and includes a right light. In this manner, the front illumination assembly 42 can illuminate the region in front of the riding mower 100. The left illumination assembly 43 and the right illumination assembly 44 may be used as position lights of the riding mower 100 so that it is convenient for other people around to notice the outline of the riding mower 100. The left illumination assembly 43 and the right illumination assembly 44 may be disposed toward the lower left side and the lower right side of the riding mower 100, respectively, thereby illuminating the region around the cutting deck 11, which is convenient for the user to observe the mowing condition.

The power supply assembly 96 is configured to supply electric power to the cutting assembly 10, the traveling assembly 93, the illumination system 40, and the like, where the first motors 13, the second motor 933, and the illumination system 40 are all electrical devices included in the riding mower 100 and can convert the electrical energy into other forms of power. The power supply assembly 96 includes at least one battery pack for storing the electrical energy. The power supply assembly 96 is disposed on the rear part of the riding mower 100. In an example, the power supply assembly 96 is behind the backrest 922 of the seat 92. In some examples, the power supply assembly 96 includes six battery packs. The six battery packs are arranged in three rows along the front and rear direction, and two battery packs are arranged in each row along the left and right direction. The power supply assembly 96 further includes a battery management system. For example, the battery management system is implemented through a battery management circuit board 964. In an example, as shown in FIG. 4, the six battery packs are connected to the battery management circuit board 964 through connecting wires 963, and the battery management circuit board 964 implements charge and discharge management of the power supply assembly 96. In addition to only including the battery packs, the power supply assembly 96 may also be configured to be a combination of a built-in cell module and an external battery pack. In this case, the battery management circuit board 964 is configured to manage the charging process of the built-in cell module and the coordinated discharge of the external battery pack and the built-in cell module. The built-in cell module has less cost and a more compact structure than the detachable external battery pack, thereby providing more adequate power storage for the riding mower 100 while saving space and cost. In addition, a certain number of detachable external battery packs are provided so that the flexibility of the power supply assembly 96 is ensured. For example, the user may take only the battery packs away for charging and does not need to drive the entire riding mower 100 to a charging station. When the user is inconvenient or not free to charge the built-in cell module of the riding mower 100, the external battery packs are inserted so that a short-time mowing requirement can be satisfied.

As shown in FIG. 4, the riding mower 100 further includes a control module 95. In some examples, the control module 95 is disposed below the seat 92, thereby saving space and making the structure of the whole machine more compact. The control module 95 is configured to control electronic devices in the systems, and the control module 95 may be a control circuit board. The control circuit board is configured to control at least the cutting assembly 10 and the traveling assembly 93. For the cutting assembly 10, the control circuit board can control the operation of the first motors 13. For the traveling assembly 93, the control circuit board can control the operation of the second motor 933. In this example, the control circuit board is mounted to the frame 91. In the front and rear direction, the control circuit board is disposed between the base plate 94 and the power supply assembly 96. In the up and down direction, the control circuit board is disposed between the seat 92 and the cutting deck 11. In the left and right direction, the control circuit board is disposed between the two longitudinal beams, that is, disposed between the first longitudinal beam 911 and the second longitudinal beam 912. The second traveling assembly 931 is located behind the control circuit board, and the cutting assembly 10 is located below the control circuit board. Since the distance between the control circuit board and the second traveling assembly 932 and the distance between the control circuit board and the cutting assembly 10 are both relatively small, wires are saved and wiring is simplified. In addition, in the first assembly manner and the second assembly manner, the operating assembly 50 of the riding mower 100 is mounted on the front side of the seat 92, and the wires of the operating assembly 50 are relatively close to the control circuit board so that such a layout can save space, facilitate wiring, and make the structure of the whole machine more compact. In an example, the control circuit board may be packaged in a main control box, thereby protecting the circuit elements and achieving waterproof and dustproof effects.

Figure 5:
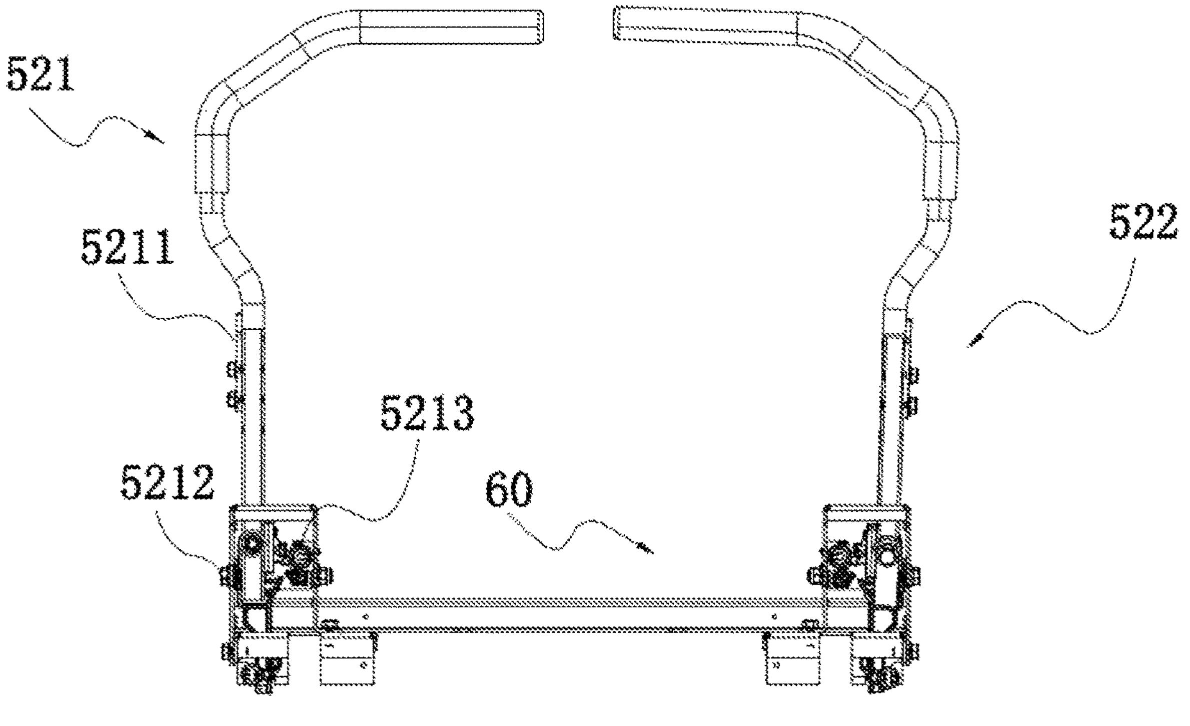
FIG. 5 is a front view of an operating lever assembly and a support assembly of the riding mower in FIG. 1.
Figure 6:
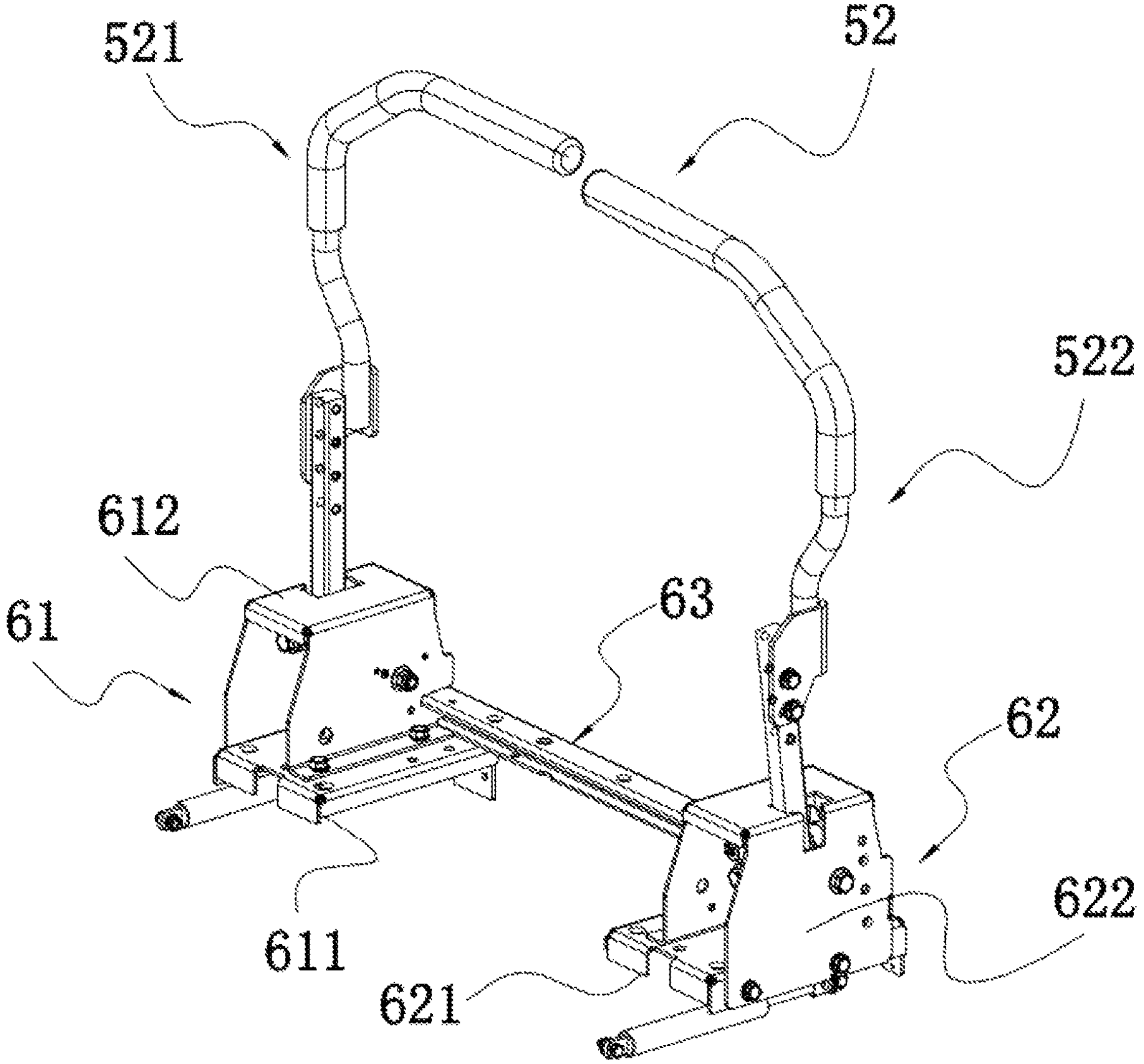
FIG. 6 is a perspective view of the operating lever assembly and the support assembly in FIG. 5.

Referring to FIGS. 5 and 6, in the first assembly manner, the operating assembly 50 of the riding mower 100 includes an operating lever assembly 52. In this example, the operating lever assembly 52 includes a first operating lever assembly 521 and a second operating lever assembly 522. The first operating lever assembly 521 is located on the left side of the seat 92 and may also be called a left operating lever assembly, and the second operating lever assembly 522 is located on the right side of the seat 92 and may also be called a right operating lever assembly. The operating lever assembly 52 is mounted to the frame 91 through a support assembly 60. The support assembly 60 is disposed on the front side of the seat 92, that is, in front of the seat cushion 922. In an example, the seat 92 further includes a seat adjustment member 923, and the support assembly 60 is disposed between the seat cushion 921 and the seat adjustment member 923 in the front and rear direction of the riding mower 100. The support assembly 60 includes a connecting rod 63, a first fixing assembly 61, and a second fixing assembly 62. The first fixing assembly is fixed to the first longitudinal beam 911, the second fixing assembly is fixed to the second longitudinal beam 912, and the connecting rod 63 connects the first fixing assembly 61 to the second fixing assembly 62 and plays a role of strengthening. In an example, the first operating lever assembly is mounted to the first fixing assembly, and the second operating lever assembly is mounted to the second fixing assembly. Referring to the figure, the first operating lever assembly 521 and the second operating lever assembly 522 are symmetrical parts. In this case, the first fixing assembly and the second fixing assembly are also symmetrical parts. The first operating lever assembly 521 includes a first operating lever 5211, a first pivot combination 5212, and a first position detection module 5213.

The first fixing assembly 61 includes a first substrate 611 and a first bracket 612. The first substrate 611 is fixedly mounted to the first longitudinal beam 911. The first bracket 612 is fixed above the first substrate 611. The first bracket 612 and the first substrate 611 together form a semi-open accommodation cavity, and one end of the first operating lever 5211 is accommodated in the accommodation cavity. In an example, the first substrate 611 is fixed to the first longitudinal beam 911 through fasteners such as screws or bolts. The width of the first substrate 611 is greater than the width of the first longitudinal beam 911. To make the first substrate 611 firmer, edges protruding downward are formed around the first substrate 611, and the edges form an open groove with a width basically the same as the width of the first longitudinal beam 911 so that the edges of the first substrate 611 are clamped on the first longitudinal beam 911, thereby preventing the first substrate 611 from shaking or turning sideways. The first bracket 612 is fixed to the first substrate 611 through fasteners such as bolts and nuts. In an example, an opening is formed on the top surface of the first bracket 612 and allows the first operating lever 5211 to pass through, and the magnitude of the opening allows the first operating lever 5211 operated by the user to rotate to a certain extent. In an example, the first operating lever 5211 is rotatable along the front and rear direction of the riding mower 100 or along the left and right direction of the riding mower 100. Therefore, the opening may be configured to be T-shaped or cross-shaped, thereby allowing the first operating lever 5211 to rotate in two directions. Optionally, the T-shaped or cross-shaped opening may extend from the top surface of the first bracket 612 to the side surface of the first bracket 612. It is to be understood that the impact of the rotating manner and position change of the first operating lever 5211 on the control state of the riding mower 100 is not within the scope of discussion of the present application, and the present application does not limit the shape of the opening of the first bracket 612.

The first operating lever assembly 521 further includes the first pivot combination 5212 for pivotally mounting the first operating lever 5211 on the first bracket 612. The first pivot combination 5212 includes at least one rotating shaft, and the rotating shaft is rotatably fixed on the first bracket 612. As shown in FIG. 5, the rotating shaft is accommodated in the accommodation cavity. The accommodation cavity also accommodates a sensing device for detecting the position of the first operating lever 5211, that is, the first position detection module 5213, for example, a magnetoresistive sensor and a magnetic element for detecting the angle of rotation using the magnetoresistive effect. Other sensors capable of detecting the position of the operating lever may be applied to the present application and all fall within the scope of the present application. Since the first operating lever assembly 521 and the second operating lever assembly 522 are symmetrical parts, the second operating lever assembly 522 is not described in detail here. The second fixing assembly 62 includes a second substrate 621 and a second bracket 622, where the second substrate 621 is fixedly mounted to the second longitudinal beam 912, and the second bracket 622 is fixed above the second substrate 621. The first bracket 612 and the second bracket 622 are separately formed with grooves, and the connecting rod 63 is clamped in the two grooves. In an example, the connecting rod 63 is a square tube. The connecting rod 63 is clamped in the grooves of the first bracket 612 and the second bracket 622 and is fixed on the first substrate 611 and the second substrate 621 through fasteners such as screws or bolts.

Figure 7:
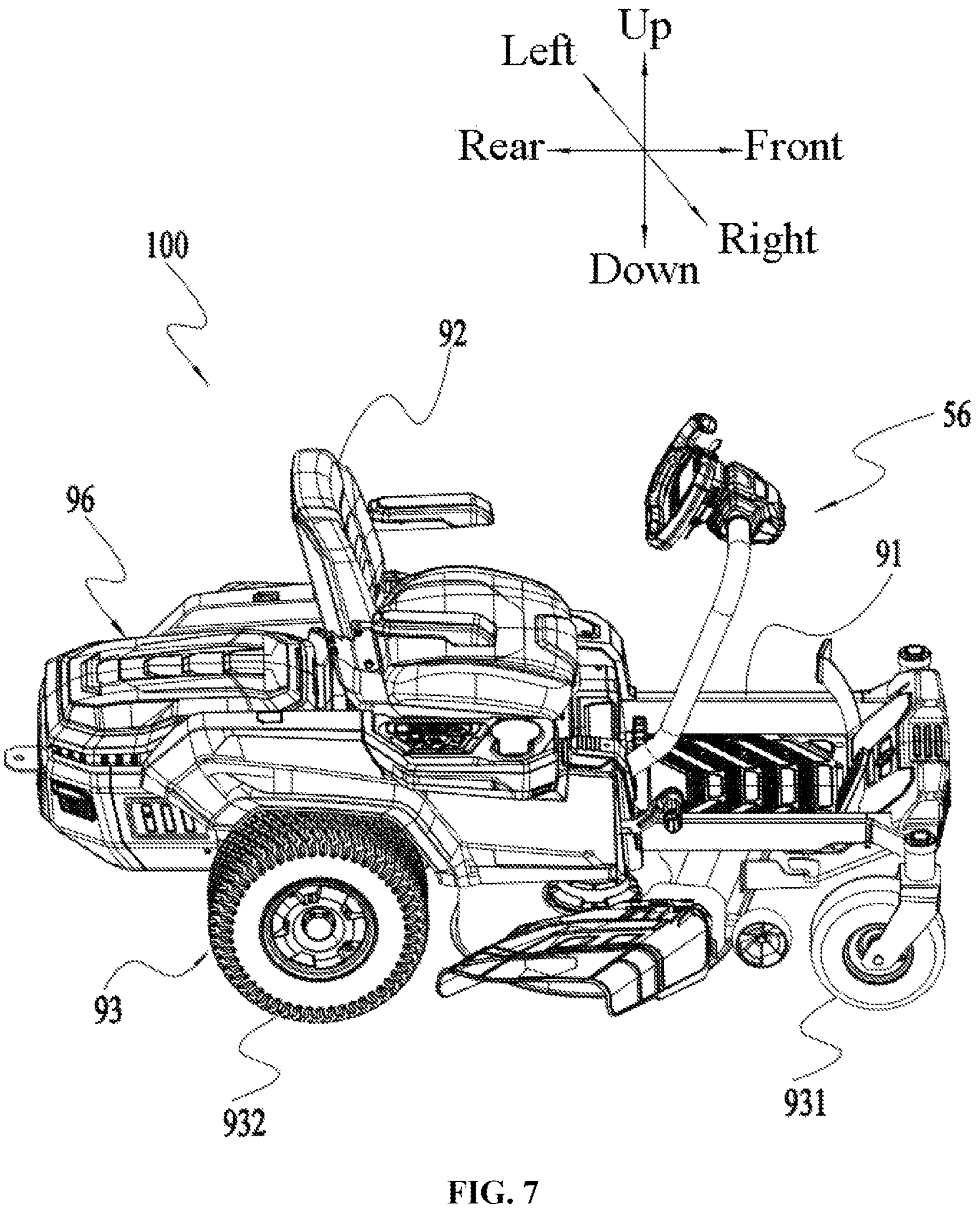
FIG. 7 is a perspective view of a riding mower in a second assembly manner according to an example of the present application.
Figure 8:
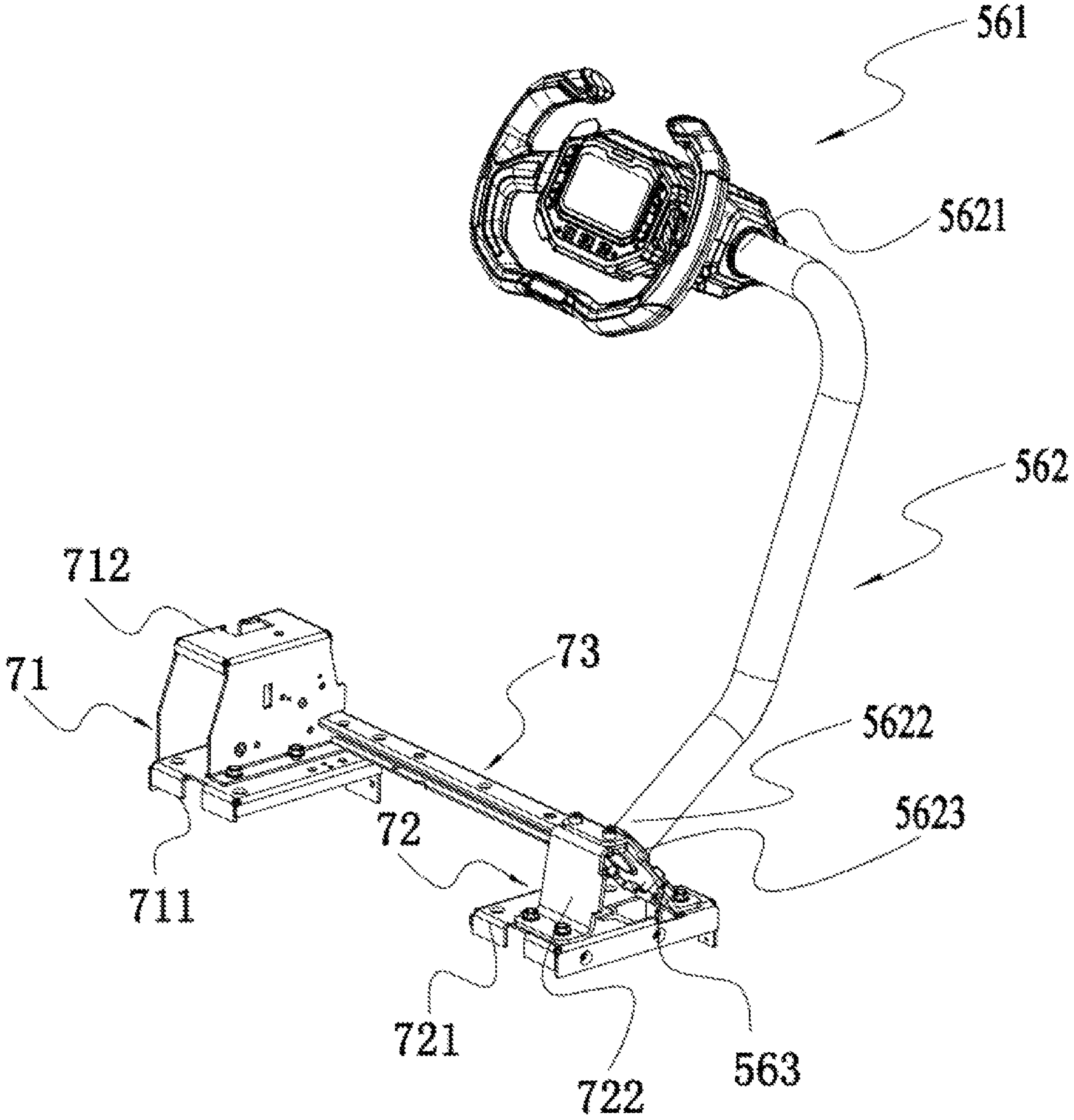
FIG. 8 is a perspective view of a steering wheel assembly and a support assembly of the riding mower in FIG. 7.

Referring to FIGS. 7 and 8, in the second assembly manner, the operating assembly 50 of the riding mower 100 includes a steering wheel assembly 56. In an example, the steering wheel assembly 56 includes a steering wheel 561 operable by the user to rotate and a support rod 562 configured to connect the steering wheel 561 to the frame 91. The support rod 562 has a first end 5621 connected to the steering wheel 561 and a second end 5622 connected to the frame 91. The support rod 562 is configured to be a hollow tube so that while the cost is saved, the wires of the steering wheel assembly 56 are allowed to pass through the hollow tube, thereby improving the safety and aesthetics of the wiring. The steering wheel assembly 56 is mounted to the frame 91 through a support assembly 70. Consistent with the support assembly 60, the support assembly 70 also includes a connecting rod 73, a first fixing assembly 71, and a second fixing assembly 72. Moreover, the positions of the support assembly 70 and the support assembly 60 are the same, and the support rod 562 is mounted to the left side or right side of the seat 92 through the support assembly 70. The first fixing assembly 71 is fixed to the first longitudinal beam 911, the second fixing assembly 72 is fixed to the second longitudinal beam 912, and the connecting rod 73 connects the first fixing assembly 71 to the second fixing assembly 72 to strengthen the support assembly 70.

In this example, the support assembly 70 is basically the same as the support assembly 60, or in other words, the support assembly 70 and the support assembly 60 have similar structures. The first fixing assembly 71 is the same as the first fixing assembly 61, and the connecting rod 73 is the same as the connecting rod 63. In this example, the support rod 562 is mounted to the frame 91 through the second fixing assembly 72. The support rod 562 may also be mounted to the frame 91 through the first fixing assembly 72. Since the two mounting manners are symmetrical, only the case where the support rod 562 is mounted to the second fixing assembly 72 is used as an example for description here. The first fixing assembly 71 includes a first substrate 711 and a first bracket 712. The first fixing assembly 71 is the same as the first fixing assembly 61. The second fixing assembly 72 also includes a second substrate 721 and a second bracket 722. The second substrate 721 of the second fixing assembly 72 is the same as the second substrate 621 of the second fixing assembly 62. The second substrate 721 may be fixedly mounted to the second longitudinal beam 912 through fasteners such as screws or bolts. The connecting rod 73 is fixed on the first substrate 711 and the second substrate 721 through fasteners such as screws or bolts.

The second bracket 722 is fixed above the second substrate 721 through fasteners such as screws or bolts. In an example, the second bracket 722 of the second fixing assembly 72 is the same as the second bracket 622 of the second fixing assembly 62. The second end 5622 of the support rod 562 may be formed or welded with a mounting surface 5623, the mounting surface 5623 is fixed on the second bracket 722 through fasteners such as screws or bolts, and the wires of the steering wheel assembly 56 may pass through the opening of the second bracket 722. In another example, the shape of the second bracket 722 of the second fixing assembly 72 is different from the shape of the second bracket 622 of the second fixing assembly 62. As shown in the figure, the second bracket 722 has an inverted V shape when viewed from the side surface. When the second bracket 722 is mounted above the second substrate 721, the second bracket 722 and the second substrate 721 together form a triangular support structure so that the second fixing assembly 72 has a more stable structure and a stronger load-bearing capacity, thereby satisfying the requirements of the first end 5621 of the support rod 562 supporting the steering wheel 561. The second end 5622 of the support rod 562 may be formed or welded with the mounting surface 5623, and the mounting surface 5623 is fixed to a side of the second bracket 722 through fasteners such as bolts. This side is provided with an opening for the wires of the steering wheel assembly 56 to pass through. The second end 5622 of the support rod 562 may be welded to a side of the second bracket 722, which is not limited in the present application.

Figure 9:
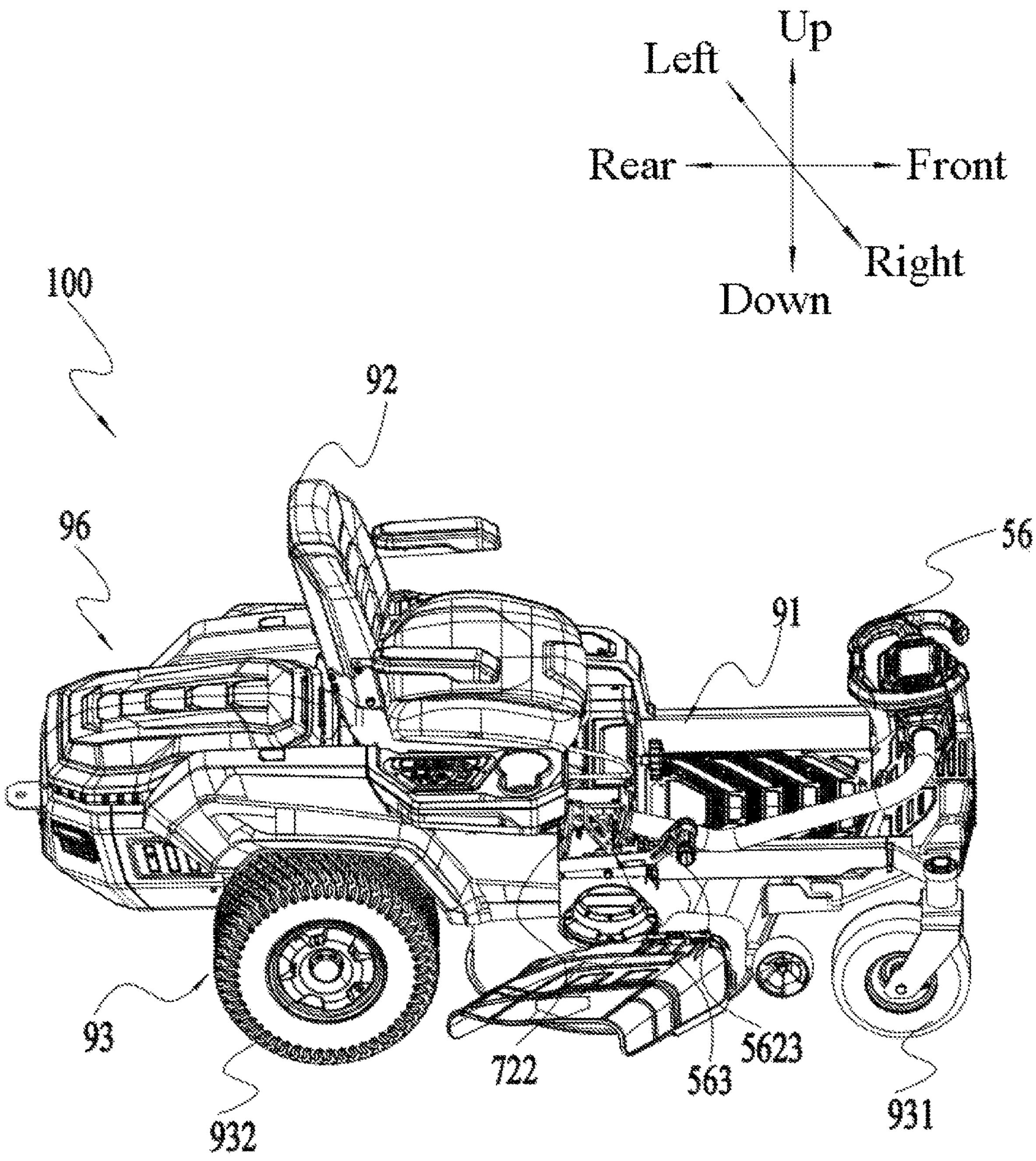
FIG. 9 is a perspective view of the riding mower in FIG. 7 when a steering wheel assembly is in a storage state.

In another example, the steering wheel assembly 56 further includes a hinge assembly 563 configured to rotatably connect the support rod 562 to the second bracket 722. For example, the hinge assembly 563 rotatably connects the second end 5622 of the support rod 562 to a side of the second bracket 722. The hinge assembly 563 is at least partially fixed on the second bracket 722, and the mounting surface 5623 of the support rod 562 is connected to the hinge assembly 563 so that the support rod 562 is rotatable relative to the second bracket 722. Therefore, the hinge assembly 563 enables the steering wheel assembly 56 to switch between a working position and a storage position. As shown in FIG. 7, at the working position, the support rod 562 is erected to support the steering wheel 561 upward so that when sitting upright on the seat, the user can comfortably hold the steering wheel 561 with both hands. As shown in FIG. 9, at the storage position, the support rod 562 folds down, allowing the riding mower 100 to occupy less space during storage and transportation. The distance between the steering wheel 561 and a plane where the riding mower 100 is located when the steering wheel assembly 56 is at the storage position is less than the distance between the steering wheel 561 and the plane when the steering wheel assembly 56 is at the working position. To fix the steering wheel assembly 56 at the working position, the mounting surface 5623 at the second end 5622 of the support rod 562 is fixed to the second bracket 722 by at least one fastener, such as a tightening bolt. To place the steering wheel assembly 56 at the storage position, the fastener is loosened.

Figure 10:
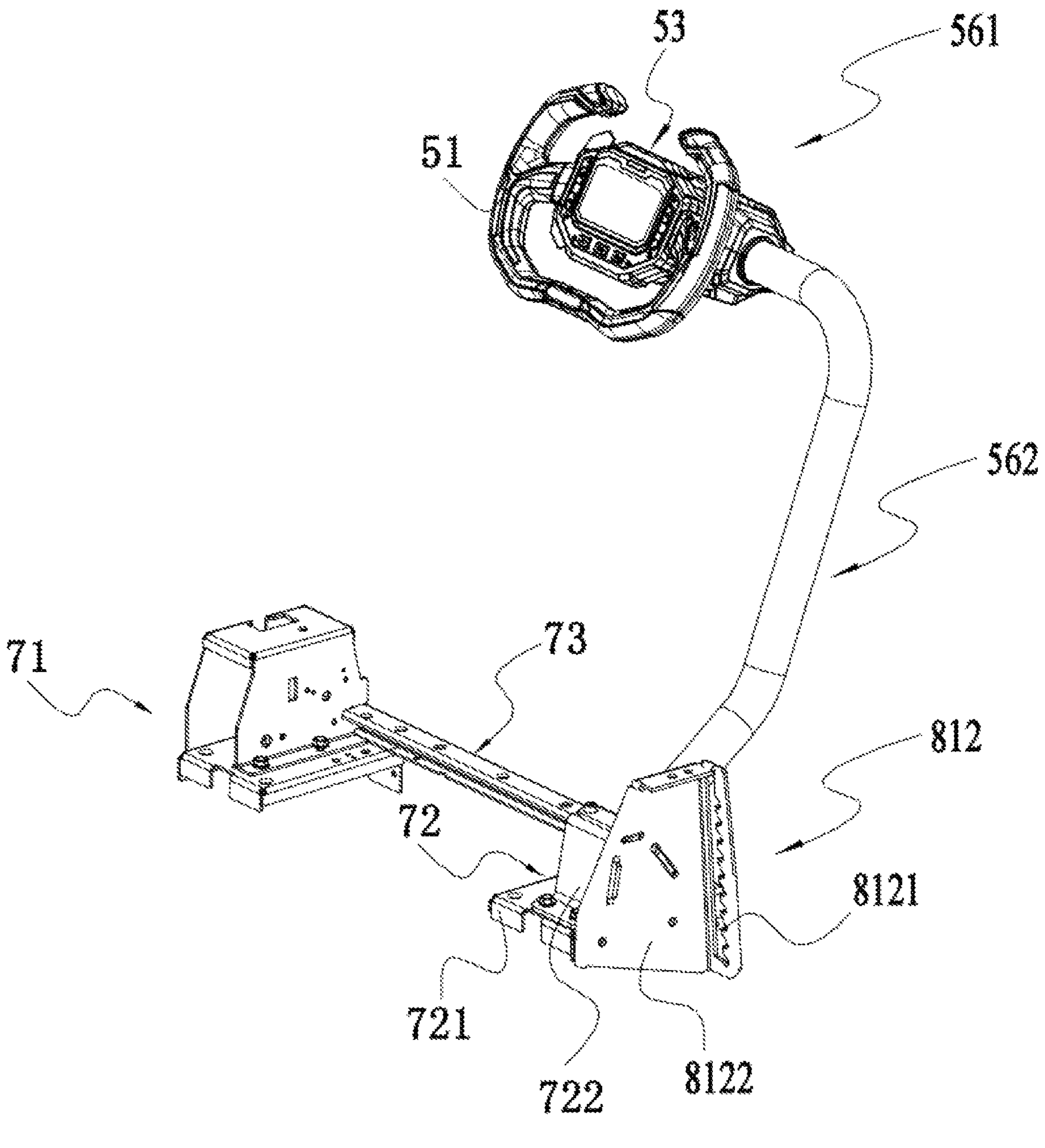
FIG. 10 is a perspective view of a steering wheel assembly, a support assembly, and a limiting member of the riding mower in FIG. 7.

In this example, as shown in FIG. 4, the riding mower 100 further includes a cutting deck height adjustment assembly 80 for adjusting the height of the cutting deck 11 relative to the frame 91. The cutting deck height adjustment assembly 80 includes a gear assembly 81 and a linkage assembly 82. The gear assembly 81 includes an adjustment member 811 and a limiting member 812. The adjustment member 811 is configured for the user to operate to set different heights of the cutting deck. The limiting member 812 includes multiple gears and is configured to limit the adjustment member 811 to a preset gear. The linkage assembly 82 connects the gear assembly 81 to the cutting deck 11. The gear assembly 81 is supported by the frame 91. In this example, the limiting member 812 is mounted to the first fixing assembly 71 or the second fixing assembly 72. For example, the case where the limiting member 812 is mounted to the second fixing assembly 72 is used as an example. Referring to FIG. 10, the limiting member 812 includes a limiting portion 8121 and a mounting portion 8122. The mounting portion 8122 is formed with holes and is fixed to the second substrate 721 through fasteners such as bolts. Optionally, the mounting portion is formed with grooves. The second bracket 722 is formed with protrusions mating with the grooves. The protrusion extends into the groove, thereby facilitating the positioning and installation of the limiting member 812. If the limiting member 812 is mounted to the first fixing assembly 71, the limiting member 812 may also be fixed to the first substrate 711 or the first bracket 712 through corresponding grooves or holes. Through the support assembly 60 and the support assembly 70 that are basically the same, two assembly manners of the riding mower 100 may be achieved, so as to satisfy the preferences of the user for the two different operating assemblies which are the steering wheel and the operating levers.

Figure 11:
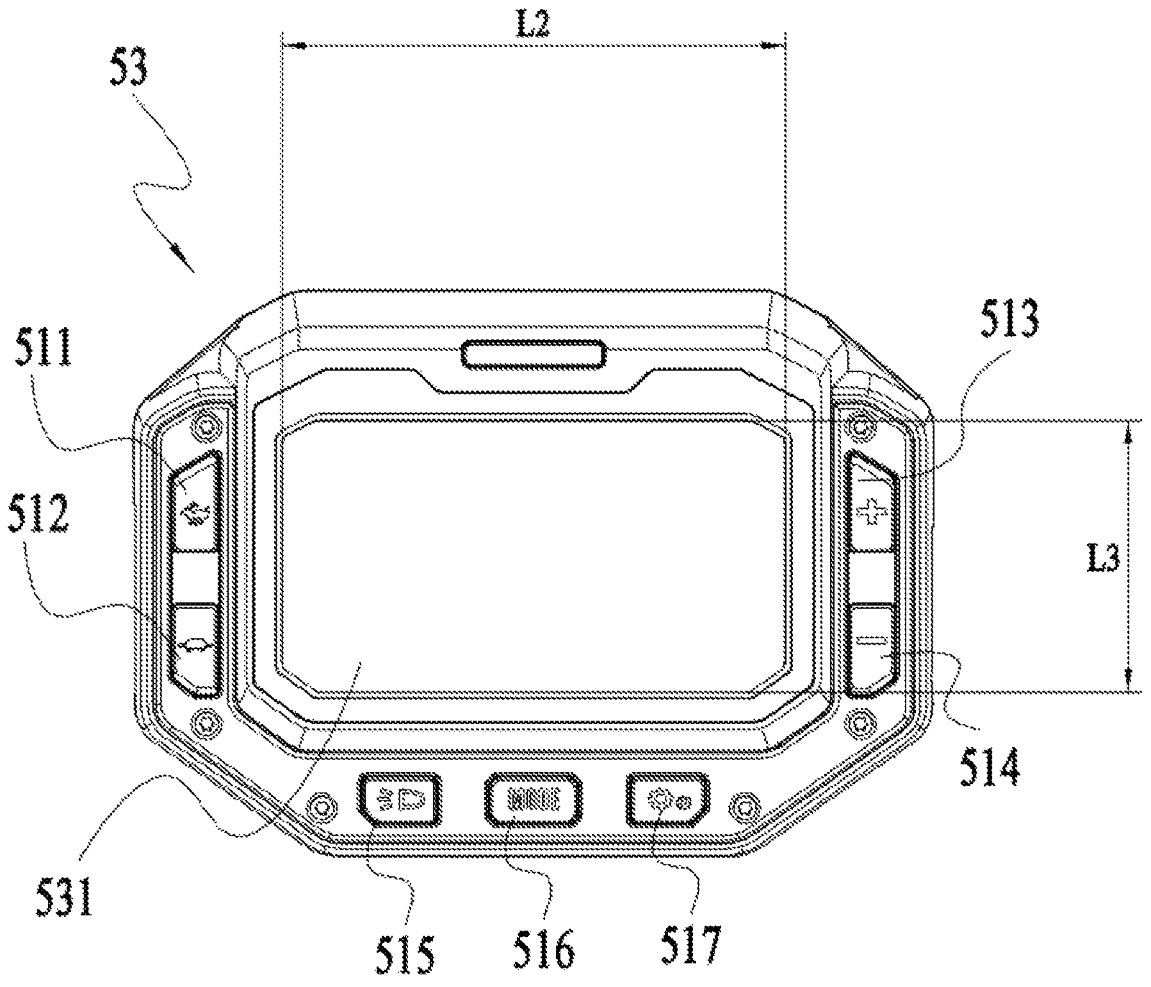
FIG. 11 is a front view of a display interface of a riding mower according to an example of the present application.

As shown in FIGS. 10 and 11, in an example, a display interface 53 is further provided in the middle of the steering wheel 561 and includes a display screen 531 and multiple operating members 51 so that the user can view the display screen 531 while operating the steering wheel 561 and can operate the multiple operating members 51 with the hands on the steering wheel, which is more in line with the ergonomic design. The display screen 531 is used for displaying the state information of the riding mower 100. The multiple operating members 51 are operable by the user to control the traveling assembly, the cutting assembly, and the like. For example, different state information may be displayed on the display screen 531 as required. For example, the driving speed of the traveling assembly 93, the rotational speed of the mowing elements 12, the energy efficiency state of the riding mower 100, the remaining power information of the power supply assembly 96, the remaining operation time of the power supply assembly 96, the warning information, the fault information, and the like may be displayed on the display screen 531.

The multiple operating members 51 may be buttons arranged around the display screen 531. For example, a first button 511 and a second button 512 are separately configured for the user to operate to adjust the driving speed of the riding mower 100. The first button 511 is operable by the user to increase the driving speed of the riding mower 100, and the second button 512 is operable by the user to decrease the driving speed of the riding mower 100. A third button 513 and a fourth button 514 are separately configured for the user to operate to adjust the rotational speed of the mowing elements of the riding mower 100. The third button 513 is operable by the user to increase the rotational speed of the mowing elements 12, and the fourth button 514 is operable by the user to decrease the rotational speed of the mowing elements 12. The first button 511 and the second button 512 are disposed on the left side of the display screen 531, and the third button 513 and the fourth button 514 are disposed on the right side of the display screen 531. A fifth button 515 is further disposed around the display screen 531 and is configured for the user to operate to control the lighting function of the riding mower 100. For example, when the user operates the fifth button 515 by using a first operation manner, the illumination system 40 turns on some lights; when the user operates the fifth button 515 by using a second operation manner, the illumination system 40 turns on all the lights; and when the user operates the fifth button 515 by using a third operation manner, the illumination system 40 turns off all the lights. A sixth button 516 is further disposed around the display screen 531 and is used for the user to operate so that the riding mower 100 enters different driving modes, such as a sport mode, a normal mode, and a control mode. Different acceleration and maximum speed limits are set for the different driving modes so that the user may select different driving modes according to personal preferences, thereby improving the user experience of the riding mower 100. At this time, information about different driving modes of the riding mower 100 may be displayed on the display screen 531. A seventh button 517 is further disposed around the display screen 531 and is used for the user to operate to perform other configurations of the riding mower 100, for example, entering a Settings menu. The fifth button 515, the sixth button 516, and the seventh button 517 may be disposed on the lower side of the display screen 531.

It is convenient for the user to view the state information on the display screen 531, and the magnitude of the display screen 531 is understood to be the magnitude of a display region that is exposed and can be observed by the user. As shown in FIG. 11, in this example, the display screen 531 is basically rectangular. The dimension of the display screen 531 in the length direction, that is, the length L2, is greater than or equal to 10 cm and less than or equal to 15 cm, and the dimension of the display screen 531 in the width direction, that is, the width L3, is greater than or equal to 6 cm and less than or equal to 10 cm. In this manner, the dimensions of the display screen 531 are large enough for the display screen 531 to display more state information that the user wants to know. The area of the display screen 531 is greater than or equal to 60 $cm^2$ and less than or equal to 150 $cm^2$. For the second assembly manner, since the display interface 53 is disposed in the middle of the steering wheel 561, when holding the steering wheel 561 with hands, the user can easily observe the information displayed on the display screen 531 and smoothly operate the multiple operating members 51 around the display screen 531.

Figure 12:
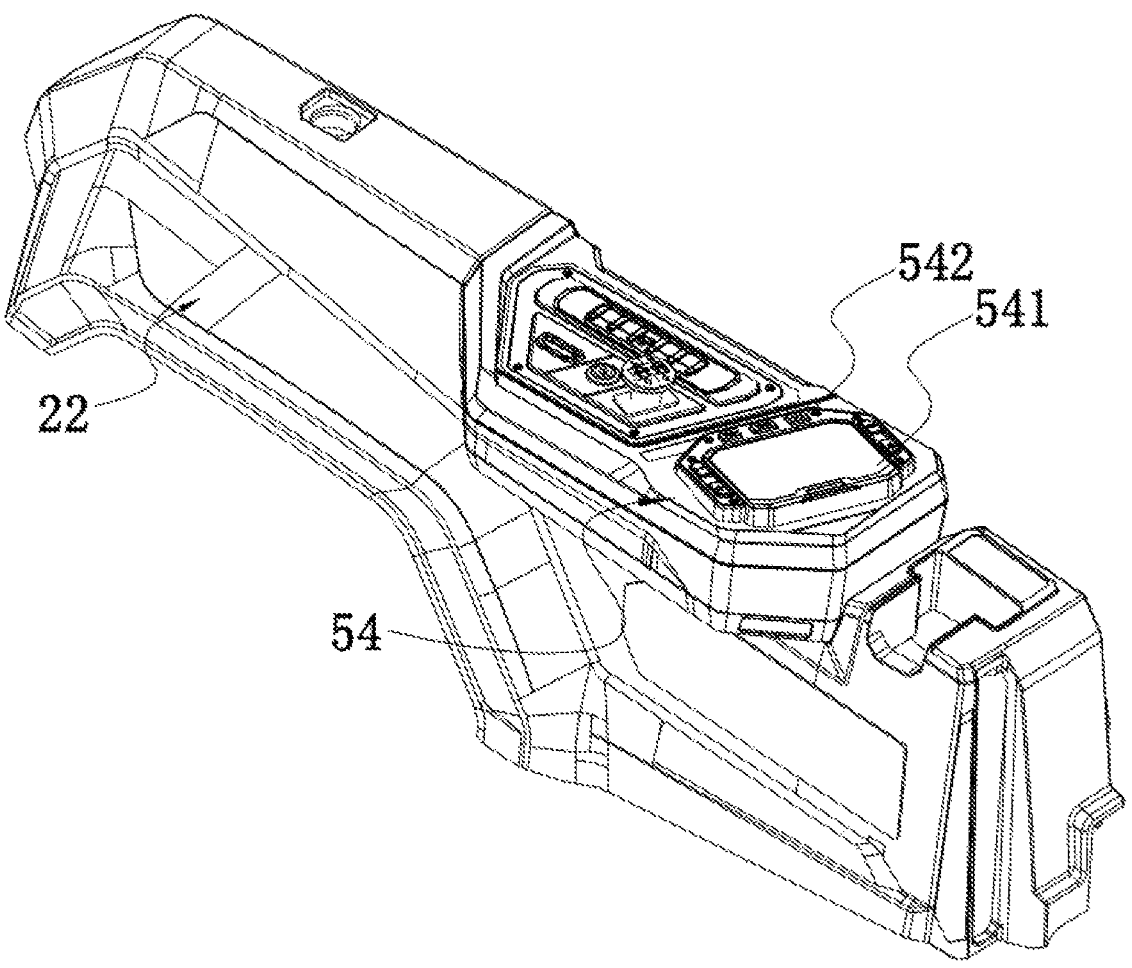
FIG. 12 is a perspective view of the display interface in FIG. 11 disposed on a right cover of the riding mower in FIG. 1.

For the first assembly manner, that is, when the operating assembly 50 is the operating lever assembly 52 instead of the steering wheel assembly 56, the riding mower 100 may also include a display interface. In this example, as shown in FIG. 12, a display interface 54 of the riding mower 100 using the operating lever assembly 52 is the same as the display interface 53 of the riding mower 100 using the steering wheel assembly 56. For example, the display interface 54 also includes a display screen 541 and multiple operating members 542. The display screen 541 is the same as the display screen 531, and the arrangement and distribution of the multiple operating members 542 may be the same as the arrangement and distribution of the multiple operating members 51. The details are not repeated here. When no steering wheel exists, for the convenience of the user to operate the multiple operating members 542, the display interface 54 may be disposed on the left side or right side of the seat 92. In an example, the display interface 54 is disposed on the housing system 20. As shown in FIG. 12, the display interface 54 is disposed on the right cover 22. In other examples, the display interface 54 may be disposed on the left cover 21. The riding mower of the present disclosure may not include the display interface, whether in the first assembly manner or the second assembly manner. In the present application, through a shared riding mower production and manufacturing platform, only through simple switching of a few components, the riding mower equipped with the operating lever assembly is produced in the first assembly manner, and the riding mower equipped with the steering wheel assembly is produced in the second assembly manner, thereby satisfying the preferences of different users.

Figure 13:
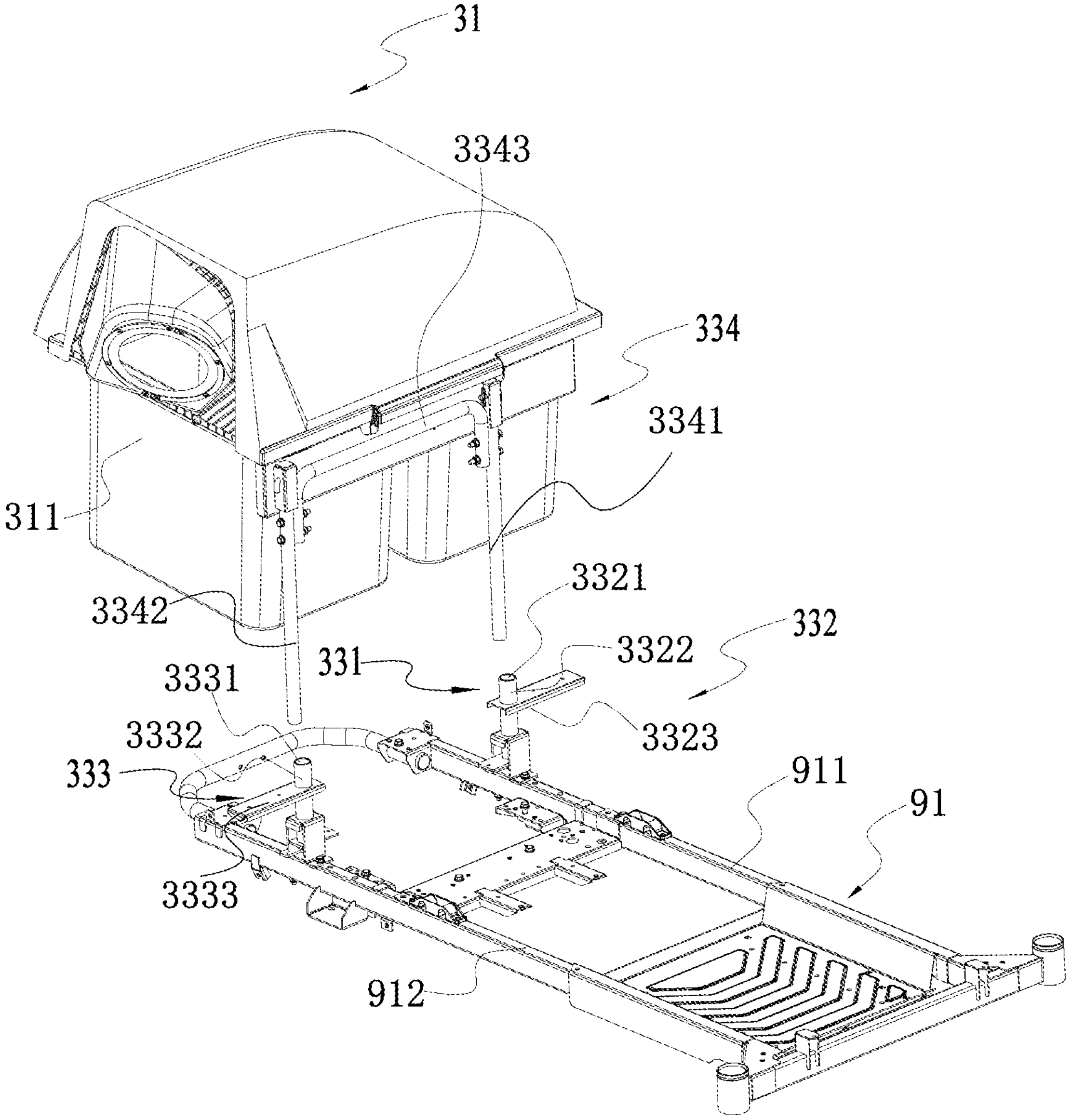
FIG. 13 is a schematic view illustrating the installation of a grass collecting basket assembly according to an example of the present application.

As shown in FIGS. 2 and 13, the grass collecting system 30 includes the grass collecting basket assembly 31 and a grass collecting tube 32. The grass collecting basket assembly 31 is configured to collect the grass clippings cut by the cutting assembly 10. The cutting deck 11 is connected to the grass collecting system 30 through the grass collecting tube 32. Further, a flip cover 115 is connected to the side surface of the cutting deck 11 and has a first position and a second position. When the flip cover 115 is at the first position, the riding mower 100 is in the grass discharge mode. At this time, the grass clippings cut by the cutting assembly 10 may be discharged to the right side of the riding mower 100 through the flip cover 115. When the flip cover 115 is at the second position, the cutting deck 11 may be connected to the grass collecting system 30 through the grass collecting tube 32. At this time, the riding mower 100 is in the grass collecting mode so that the grass clippings cut by the cutting assembly 10 may be discharged to the grass basket through the flip cover 115. The grass collecting basket assembly 31 is disposed behind the seat 92, the power supply assembly 96 is disposed between the seat 92 and the second cross beam 914, and the second cross beam 914 is also the rear bumper so that the rear bumper can protect the power supply assembly 96 from being damaged. The grass collecting basket assembly 31 includes a grass basket body 311, the grass basket body 311 is disposed on the upper side of the power supply assembly 96, and the grass basket body 311 protrudes backward from the power supply assembly 96 along the front and rear direction of the riding mower 100. In this manner, the grass basket body 311 can protect the power supply assembly 96 so that the riding mower 100 has a more reliable structure and a longer service life. The riding mower 100 further includes a mounting assembly configured to mount attachments such as the grass collecting basket assembly 31 to the frame 91.

In an example, the mounting assembly is a mounting seat assembly 331. The mounting seat assembly 331 includes a first mounting seat 332 and a second mounting seat 333. The first mounting seat 332 and the second mounting seat 333 are symmetrical. The first mounting seat 332 includes a first mounting post 3322 and a first extension seat 3323, and the second mounting seat 333 includes a second mounting post 3332 and a second extension seat 3333. The first mounting seat 332 is formed with a first mounting hole 3321, and the second mounting seat 333 is formed with a second mounting hole 3331. The first extension seat 3323 extends from the first mounting post 3322 in a direction away from the first mounting post 3322, and the second extension seat 3333 extends from the second mounting post 3332 in a direction away from the second mounting post 3332. In an example, the left cover 21 is fixedly connected to the first extension seat 3323, and the right cover 22 is fixedly connected to the second extension seat 3333. In this manner, the strength of the first mounting seat 332 and the second mounting seat 333 can be improved, and the problems of the inconvenient installation and the unstable structure caused by the left cover 21 and the right cover 22 directly mounted on the first longitudinal beam 911 and the second longitudinal beam 912 can be avoided. The first mounting seat and the first extension seat 3323 are welded into one body, and the second mounting seat and the second extension seat 3333 are welded into one body. The first mounting seat 332 is connected to the first longitudinal beam 911 through screws, and the second mounting seat 333 is connected to the second longitudinal beam 912 through screws. In this manner, the first mounting seat 332 needs to bear the weight of the left cover 21 located on the left side of the seat 92 and the weight of the grass collecting system 30 located on the rear side of the seat 92 so that the stress borne by the first mounting seat 332 is relatively evenly distributed, thereby improving the service life of the riding mower 100. In this manner, the second mounting seat 333 needs to bear the weight of the right cover 22 located on the right side of the seat 92 and the weight of the grass collecting system 30 located on the rear side of the seat 92 so that the stress borne by the second mounting seat 333 is relatively evenly distributed, thereby improving the service life of the riding mower 100.

The grass collecting basket assembly 31 further includes a grass collecting basket connecting rod assembly 334. The grass collecting basket connecting rod assembly 334 includes a first connecting rod 3341 detachably inserted into the first mounting hole 3321, a second connecting rod 3342 detachably inserted into the second mounting hole 3331, and an intermediate rod 3343. The intermediate rod 3343 is disposed between the first connecting rod 3341 and the second connecting rod 3342 to connect the first connecting rod 3341 to the second connecting rod 3342. In this manner, when the grass collecting basket assembly 31 is mounted to the frame 91, the first connecting rod 3341 is inserted into the first mounting hole 3321, the second connecting rod 3342 is inserted into the second mounting hole 3331, the intermediate rod 3343 is connected to the first connecting rod 3341 and the second connecting rod 3342, and finally, the grass basket body 311 is mounted to the connecting rod assembly 334 so that the grass collecting system 30 can be mounted to the frame 91 through simple operations.

Figure 15:
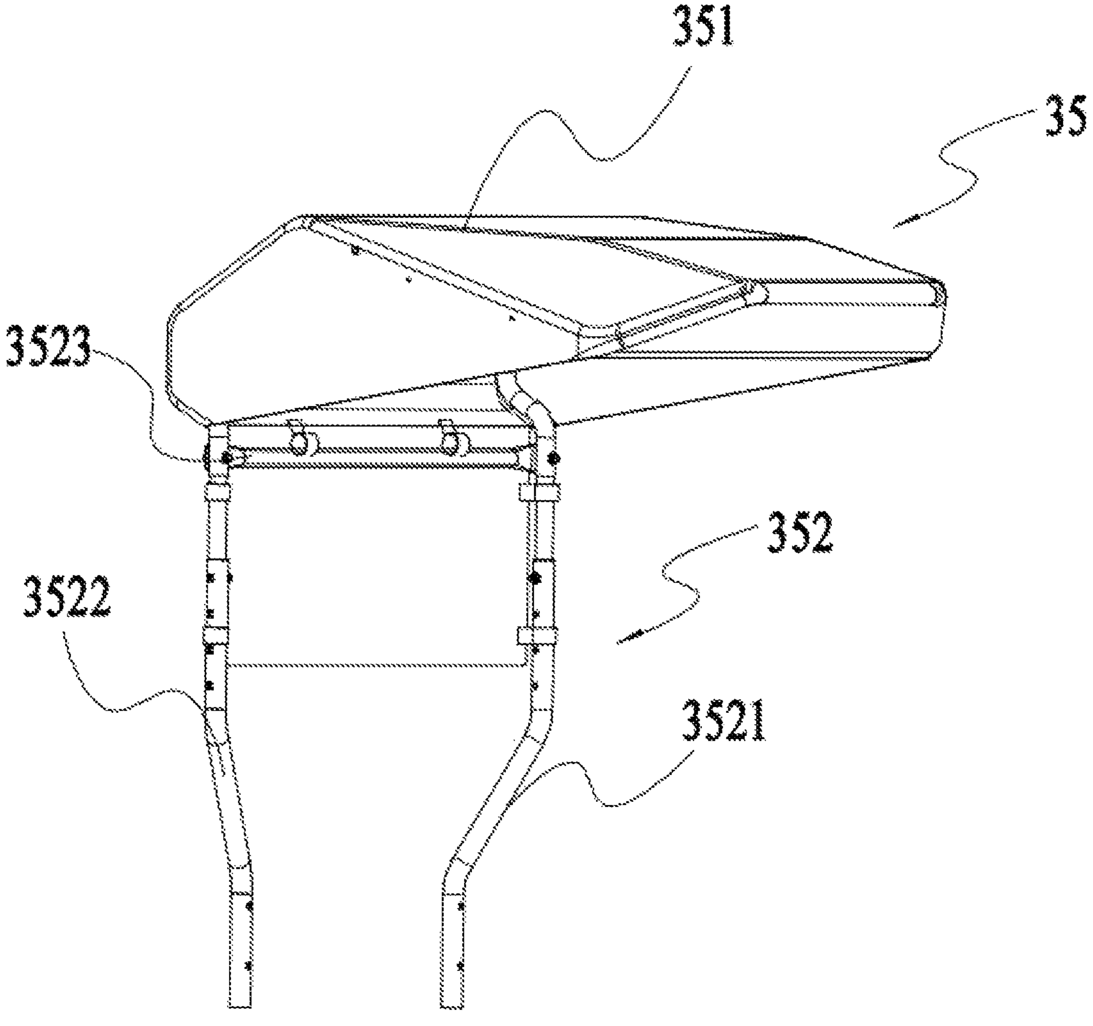
FIG. 15 is a perspective view of the sun shade assembly in FIG. 14.
Figure 16:
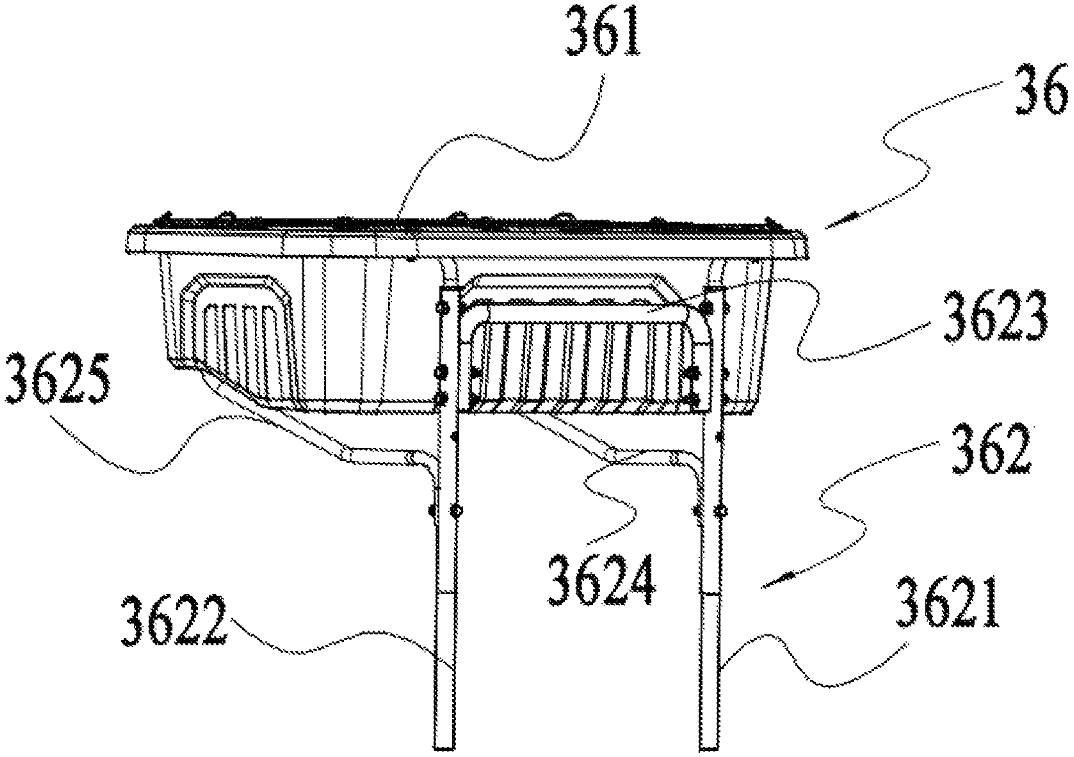
FIG. 16 is a perspective view of the storage box assembly in FIG. 14.

In this example, the structure of the mounting seat assembly 331 is simple, where the first mounting seat 332 is formed with the first mounting hole 3321, the second mounting seat 333 is formed with the second mounting hole 3331, and the first mounting hole 3321 and the second mounting hole 3331 is used for mounting the grass collecting basket assembly 31 to the frame 91. The first mounting seat 332 and the second mounting seat 333 are highly versatile and are also applicable to a sun shade assembly 35 and a storage box assembly 36 shown in FIGS. 14 to 16. The sun shade assembly 35 includes a sun shade cover 351 and a sun shade connecting rod assembly 352. The sun shade connecting rod assembly 352 includes a first connecting rod 3521, a second connecting rod 3522, and an intermediate rod 3523. The sun shade cover 351 is connected to the sun shade connecting rod assembly 352, and the first connecting rod 3521 and the second connecting rod 3522 are detachably connected and can be separated from each other. For example, the intermediate rod 3523 is separately detachably connected to the first connecting rod 3521 and the second connecting rod 3522. The first connecting rod 3521 and the second connecting rod 3522 are inserted into the first mounting hole 3321 and the second mounting hole 3331, respectively so that the sun shade assembly 35 is mounted to the frame 91 through the mounting seat assembly 331. The storage box assembly 36 includes a storage box 361 and a storage box connecting rod assembly 362. The storage box connecting rod assembly 362 includes a first connecting rod 3621, a second connecting rod 3622, and an intermediate rod 3623. The storage box 361 is connected to the storage box connecting rod assembly 362, and the first connecting rod 3621 and the second connecting rod 3622 are detachably connected and can be separated from each other. For example, the intermediate rod 3623 is separately detachably connected to the first connecting rod 3621 and the second connecting rod 3622. The first connecting rod 3621 and the second connecting rod 3622 are inserted into the first mounting hole 3321 and the second mounting hole 3331, respectively so that the storage box assembly 36 is mounted to the frame 91 through the mounting seat assembly 331. In an example, to increase the load-bearing capacity of the storage box 361, two auxiliary connecting rods may be added, such as a fourth connecting rod 3624 and a fifth connecting rod 3625, to hold up an end of the storage box 361 facing away from the intermediate rod 3623. The fourth connecting rod 3624 and the fifth connecting rod 3625 are fixed on the first connecting rod 3621 and the second connecting rod 3622, respectively through fasteners such as screws.

Figure 14:
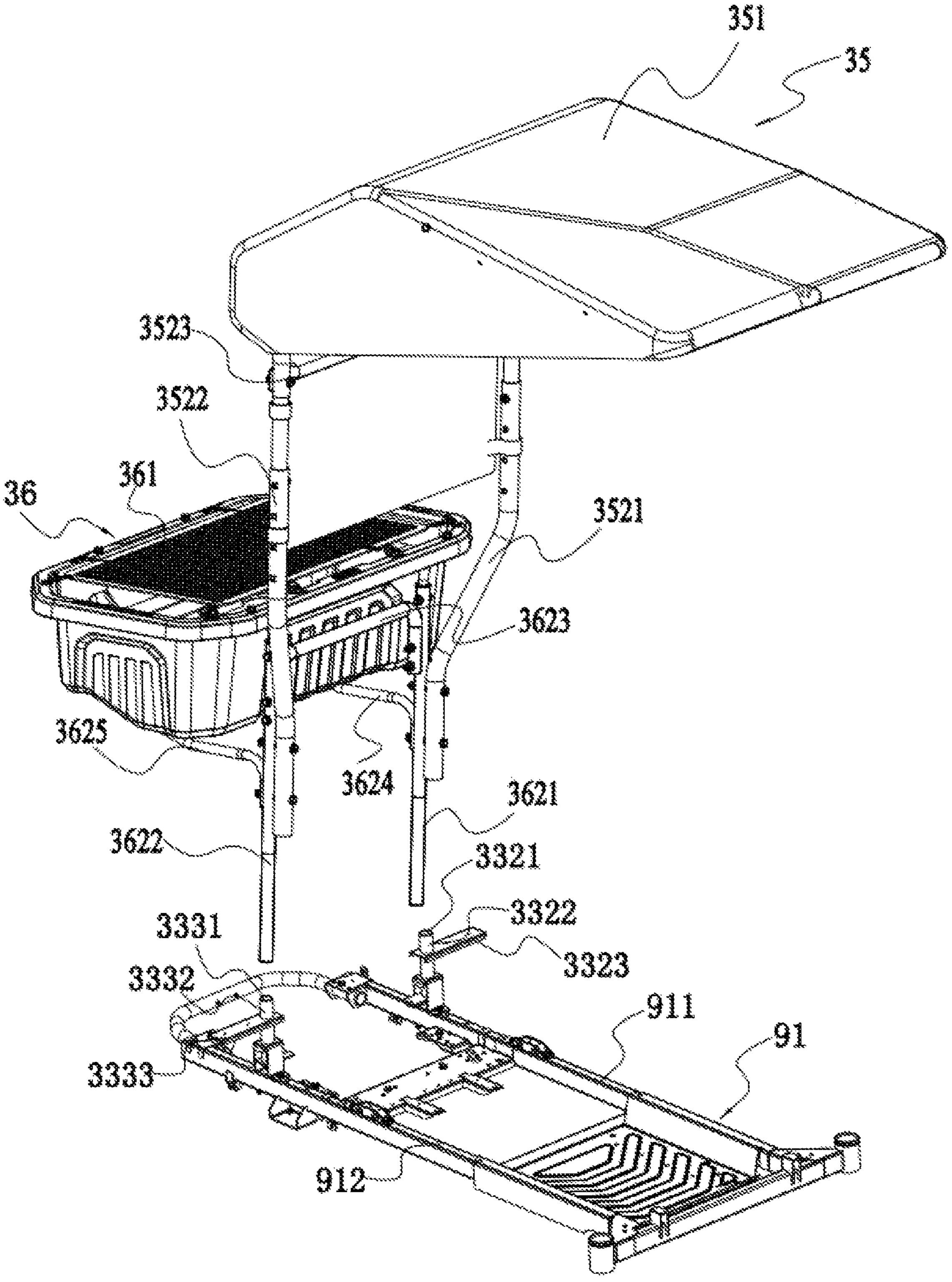
FIG. 14 is a schematic view illustrating the installation of a sun shade assembly and a storage box assembly according to an example of the present application.

In addition to the sun shade assembly 35 and the storage box assembly 36 being separately mounted on the frame 91, in an example, the sun shade assembly 35 and the storage box assembly 36 may be mounted on the frame 91 together. As shown in FIG. 14, the sun shade assembly 35 and the storage box assembly 36 may be fixed back to back. For example, the first connecting rod 3521 of the sun shade connecting rod assembly 352 and the first connecting rod 3621 of the storage box connecting rod assembly 362 are fixed through fasteners such as screws or bolts, the second connecting rod 3522 of the sun shade connecting rod assembly 352 and the second connecting rod 3622 of the storage box connecting rod assembly 362 are fixed through fasteners such as screws or bolts, and finally, the first connecting rod 3621 and the second connecting rod 3622 of the storage box connecting rod assembly 362 are inserted into the first mounting hole 3321 and the second mounting hole 3331, respectively, or the first connecting rod 3521 and the second connecting rod 3522 of the sun shade connecting rod assembly 352 are inserted into the first mounting hole 3321 and the second mounting hole 3331, respectively so that the sun shade assembly 35 and the storage box assembly 36 can be combined and mounted. After installation, the user can enjoy the shade brought by the sun shade cover 351 and the convenience brought by the storage box 361 at the same time.

What is claimed is:

1. A riding mowing device, comprising:

a frame;

a seat configured for a user to sit on;

a cutting assembly comprising a cutting deck and a mowing element, wherein the mowing element is at least partially accommodated in the cutting deck, and the cutting assembly is mounted to the frame;

a traveling assembly configured to drive the riding mowing device to travel and comprising a first traveling assembly located on a front part of the riding mowing device and a second traveling assembly located on a rear part of the riding mowing device, wherein the first traveling assembly and the second traveling assembly are separately mounted on the frame; and a power supply assembly configured to supply power to at least the cutting assembly and the traveling assembly and mounted to the frame;

wherein the riding mowing device further comprises interchangeably a steering wheel assembly and an operating lever assembly, and one of the steering wheel assembly and the operating lever assembly is selectively mounted on the riding mowing device;

wherein when the steering wheel assembly is mounted on the riding mowing device, the steering wheel assembly comprises a steering wheel and a support rod; and when the operating lever assembly is mounted on the riding mowing device, the operating lever assembly comprises a left operating lever and a right operating lever, the left operating lever and the right operating lever are mounted on a left side and a right side of the seat, respectively.

2. The riding mowing device of claim 1, wherein an installation position of the steering wheel assembly is the same as an installation position of the operating lever assembly.

3. The riding mowing device of claim 1, wherein the frame comprises a first longitudinal beam and a second longitudinal beam, and the steering wheel assembly or the operating lever assembly is mounted to the first longitudinal beam and the second longitudinal beam by a support assembly.

4. The riding mowing device of claim 3, wherein the support assembly is disposed in front of the seat.

5. The riding mowing device of claim 3, wherein the support assembly comprises a connecting rod, a first fixing assembly, and a second fixing assembly, the first fixing assembly is fixed to the first longitudinal beam, the second fixing assembly is fixed to the second longitudinal beam, and the connecting rod connects the first fixing assembly to the second fixing assembly.

6. The riding mowing device of claim 5, wherein the riding mowing device comprises the operating lever assembly, the operating lever assembly comprises a left operating lever and a right operating lever, and the left operating lever and the right operating lever are mounted to the first fixing assembly and the second fixing assembly, respectively.

7. The riding mowing device of claim 6, wherein the first fixing assembly and the second fixing assembly are symmetrical parts.

8. The riding mowing device of claim 5, wherein the riding mowing device comprises the steering wheel assembly, the steering wheel assembly comprises a steering wheel and a support rod, and the support rod is detachably mounted to the first fixing assembly or the second fixing assembly.

9. The riding mowing device of claim 5, further comprising a cutting deck height adjustment assembly, wherein the cutting deck height adjustment assembly comprises a gear assembly for a user to operate to set different heights of the cutting deck, the gear assembly comprises a limiting member and an adjustment member, and the limiting member is mounted to the first fixing assembly or the second fixing assembly.

10. The riding mowing device of claim 1, further comprising a grass collecting basket assembly, wherein the grass collecting basket assembly comprises a grass collecting basket connecting rod assembly, and the grass collecting basket connecting rod assembly is detachably mounted to the frame through a mounting seat assembly.

11. The riding mowing device of claim 10, further comprising a sun shade assembly and a storage box assembly, wherein the sun shade assembly comprises a sun shade connecting rod assembly, the storage box assembly comprises a storage box connecting rod assembly, and the sun shade connecting rod assembly and the storage box connecting rod assembly are fixed to the mounting seat assembly separately or together.

12. The riding mowing device of claim 11, wherein the sun shade connecting rod assembly and the storage box connecting rod assembly are fixed by a fastener.

13. A riding mowing device, comprising:

a seat configured for a user to sit on and comprising a seat cushion and a backrest;

a cutting assembly comprising a cutting deck and a mowing element, wherein the mowing element is at least partially accommodated in the cutting deck;

a traveling assembly configured to drive the riding mowing device to travel and comprising a first traveling assembly located on a front part of the riding mowing device and a second traveling assembly located on a rear part of the riding mowing device;

a power supply assembly configured to supply power to at least the cutting assembly and the traveling assembly; and a display interface configured to display state information of at least one of the cutting assembly, the traveling assembly, and the power supply assembly and comprising a display screen;

wherein the riding mowing device further comprises one of a steering wheel assembly and an operating lever assembly, and one of the steering wheel assembly and the operating lever assembly is selectively mounted on the riding mowing device; when the steering wheel assembly is mounted on the riding mowing device, the steering wheel assembly comprises a steering wheel and a support rod, and the display interface is disposed in a middle of the steering wheel; and when the operating lever assembly is mounted on the riding mowing device, the operating lever assembly comprises a left operating lever and a right operating lever, the left operating lever and the right operating lever are mounted on a left side and a right side of the seat, respectively, and the display interface is disposed on at least one of the left side and the right side of the seat.

14. The riding mowing device of claim 13, wherein a length of the display screen is greater than or equal to 10 cm and less than or equal to 15 cm.

15. The riding mowing device of claim 13, wherein an area of the display screen is greater than or equal to 60 $cm^2$ and less than or equal to 150 $cm^2$.

16. The riding mowing device of claim 13, wherein the display interface further comprises a plurality of buttons arranged around the display screen.

17. The riding mowing device of claim 16, wherein the plurality of buttons are disposed on a left side, a right side, and a lower side of the display screen.

18. The riding mowing device of claim 13, further comprising a left cover and a right cover, wherein the second traveling assembly comprises a left second traveling wheel and a right second traveling wheel, the left cover at least partially covers the left second traveling wheel, the right cover at least partially covers the right second traveling wheel, and when the riding mowing device comprises the operating lever assembly, the display interface is disposed on the left cover or the right cover.

* * * * *